US012401114B2

(12) United States Patent
Jeong et al.

(10) Patent No.: US 12,401,114 B2
(45) Date of Patent: Aug. 26, 2025

(54) ANTENNA MODULE COMPRISING FLOATING RADIATORS IN COMMUNICATION SYSTEM, AND ELECTRONIC DEVICE COMPRISING SAME

(71) Applicant: Samsung Electronics Co., Ltd., Suwon-si (KR)

(72) Inventors: Jungi Jeong, Suwon-si (KR); Hyunjin Kim, Suwon-si (KR); Bumhee Lee, Suwon-si (KR); Seungtae Ko, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/863,857

(22) Filed: Jul. 13, 2022

(65) Prior Publication Data

US 2022/0352648 A1 Nov. 3, 2022

Related U.S. Application Data

(63) Continuation of application No. PCT/KR2021/000599, filed on Jan. 15, 2021.

(Continued)

(51) Int. Cl.

*H01Q 1/24* (2006.01)
*H01Q 1/52* (2006.01)

(Continued)

(52) U.S. Cl.

CPC ............. *H01Q 1/246* (2013.01); *H01Q 1/523* (2013.01); *H01Q 5/385* (2015.01); *H01Q 5/392* (2015.01);

(Continued)

(58) Field of Classification Search

CPC ......... H01Q 5/378–392; H01Q 19/005; H01Q 21/065; H01Q 9/0464; H01Q 1/523;

(Continued)

(56) References Cited

U.S. PATENT DOCUMENTS 4,554,549 A * 11/1985 Fassett ................ H01Q 9/0464 343/769
5,576,718 A * 11/1996 Buralli ................ H01Q 21/065 343/700 MS (Continued)

FOREIGN PATENT DOCUMENTS

CN 102017306 A 4/2011
CN 102176537 A 9/2011

(Continued)

OTHER PUBLICATIONS

Extended European Search Report dated Jan. 20, 2023, issued in a European Application No. 21741861.5-1205.

(Continued)

*Primary Examiner* — Ab Salam Alkassim, Jr.
(74) *Attorney, Agent, or Firm* — Jefferson IP Law, LLP

(57) ABSTRACT

The disclosure relates to a communication technique for merging an IoT technology with a 5th Generation (5G) communication system for supporting a higher data transmission rate than a 4th Generation (4G) system, and a system therefor. The disclosure can be applied to intelligent services (for example, smart homes, smart buildings, smart cities, smart cars or connected cars, healthcare, digital education, retail, security- and safety-related services, and the like) on the basis of 5G communication technologies and IoT-related technologies. An electronic device is provided. The electronic device includes a board, a plurality of antenna arrays arranged on the board, and a plurality of floating radiator arrays arranged on the board to be spaced apart from the plurality of antenna arrays by a predetermined distance.

(Continued)

The plurality of floating radiator arrays are electromagnetically coupled to the plurality of antenna arrays.

14 Claims, 15 Drawing Sheets

Related U.S. Application Data

(60) Provisional application No. 62/961,754, filed on Jan. 16, 2020.

(51) Int. Cl.
*H01Q 5/385* (2015.01)
*H01Q 5/392* (2015.01)
*H01Q 19/00* (2006.01)
*H01Q 21/06* (2006.01)

(52) U.S. Cl.
CPC ......... *H01Q 19/005* (2013.01); *H01Q 21/065* (2013.01)

(58) Field of Classification Search
CPC ......... H01Q 5/49; H01Q 15/006–0093; H01Q 1/246; H01Q 1/52–523
See application file for complete search history.

(56) References Cited

U.S. PATENT DOCUMENTS 5,745,079 A * 4/1998 Wang ..................... H01Q 5/378 343/846
5,955,994 A * 9/1999 Staker .................. H01Q 19/005 343/700 MS
6,069,586 A * 5/2000 Karlsson .............. H01Q 19/005 343/815
6,114,998 A * 9/2000 Schefte ................ H01Q 9/0414 343/768
6,184,828 B1 * 2/2001 Shoki ....................... H01Q 3/26 342/372
6,518,931 B1 * 2/2003 Sievenpiper ......... H01Q 15/008 343/770
8,487,816 B2 7/2013 Saily
9,698,487 B2 7/2017 Sudo et al.
10,148,012 B2 12/2018 Wu et al.
10,476,149 B1 * 11/2019 Ueda ...................... H01Q 21/08
10,601,145 B2 * 3/2020 Biscontini ............ H01Q 19/005
10,804,609 B1 * 10/2020 Nosrati .................... H01Q 3/26
11,081,807 B2 * 8/2021 Jong ...................... H01Q 1/243
11,177,557 B2 11/2021 Lee et al.
11,502,393 B2 * 11/2022 Park ......................... H01Q 1/38
12,003,038 B2 * 6/2024 Korva .................. H01Q 21/065
2005/0179610 A1 * 8/2005 Le .......................... H01Q 21/28 343/797
2006/0103576 A1 * 5/2006 Mahmoud ................ H01Q 1/28 343/700 MS
2007/0052587 A1 * 3/2007 Cheng .................... H01Q 5/378 343/700 MS
2007/0139294 A1 * 6/2007 Dunn ..................... H05K 1/165 343/909
2008/0174503 A1 7/2008 Kim et al.
2010/0171675 A1 7/2010 Borja et al.
2011/0309986 A1 * 12/2011 Ying ...................... H01Q 5/385 343/752
2012/0218162 A1 * 8/2012 Aoki ...................... H01Q 5/321 343/893
2012/0242556 A1 * 9/2012 Ando ....................... H01Q 9/42 343/834
2013/0169506 A1 * 7/2013 Aoki ...................... H01Q 21/26 343/853
2014/0368395 A1 12/2014 Dauguet et al.
2015/0194728 A1 * 7/2015 Piau ....................... H01Q 1/286 343/841
2016/0172757 A1 * 6/2016 Gottl ...................... H01Q 1/246 343/700 MS
2016/0344093 A1 * 11/2016 Tagi ....................... H01Q 1/525
2017/0033461 A1 * 2/2017 Mohajer Jasebi ... H01Q 1/2291
2017/0229784 A1 * 8/2017 Kitamura ............. H01Q 9/0414
2017/0264021 A1 * 9/2017 Heyde .................... H01Q 9/285
2019/0013590 A1 * 1/2019 Rowell .................. H01Q 3/267
2019/0020100 A1 * 1/2019 Jong ........................ H01Q 1/48
2019/0166686 A1 * 5/2019 Jo ........................ H05K 1/0271
2019/0173167 A1 * 6/2019 Ariumi .................... H01Q 3/24
2019/0237879 A1 * 8/2019 Park ....................... H01Q 1/243
2019/0372225 A1 12/2019 Zimmerman et al.
2019/0386393 A1 * 12/2019 Chiang .................... H01Q 5/28
2020/0076092 A1 * 3/2020 Chiang ................ H01Q 9/0407
2020/0106183 A1 * 4/2020 Fabrega Sanchez ........................ H01Q 25/001
2020/0112092 A1 * 4/2020 Hsieh ....................... H01Q 5/30
2020/0303820 A1 * 9/2020 Jang ....................... H01Q 15/14
2020/0303836 A1 * 9/2020 Li ........................ H01Q 21/245
2020/0358173 A1 * 11/2020 Jong ...................... H01Q 1/243
2021/0044028 A1 * 2/2021 Lee ........................ H01Q 21/08
2021/0098864 A1 * 4/2021 Zhang .................... H01Q 1/523
2021/0126366 A1 * 4/2021 Sudo ...................... H01Q 5/378
2021/0151899 A1 * 5/2021 Park ....................... H01Q 21/28
2021/0384629 A1 * 12/2021 Murch ................. H01Q 21/062
2021/0391647 A1 * 12/2021 Guo ..................... H01Q 19/106
2022/0045442 A1 * 2/2022 Fabrega Sanchez .... H01Q 5/49
2022/0255222 A1 * 8/2022 Korva .................. H01Q 21/065
2022/0320716 A1 * 10/2022 Zhang ................ H01Q 15/0013
2023/0092210 A1 * 3/2023 Yang ........................ H01Q 1/36 343/702
2024/0113418 A1 * 4/2024 Enkhbayar ............. H01Q 21/24
2024/0305014 A1 * 9/2024 Huang ................. H01Q 9/0414

FOREIGN PATENT DOCUMENTS

CN 104347939 A 2/2015
CN 109256612 A 1/2019
FR 3036541 A1 * 11/2016 ....... G06K 19/07783
JP 2019-080298 A 5/2019
KR 10-2008-0062894 A 7/2008
KR 10-2012-0078732 A 7/2012
KR 10-2014-0109986 A 9/2014
KR 10-2015-0055042 A 5/2015
KR 10-2019-0007734 A 1/2019
KR 10-2019-0060573 A 6/2019
WO WO-9112637 A1 * 2/1991

OTHER PUBLICATIONS

Chinese Office Action dated May 27, 2024, issued in Chinese Application No. 202180009612.5.
Chinese Office Action dated Feb. 11, 2025, issued in Chinese Application No. 202180009612.5.
Korean Notification of the Reasons for Rejection dated Feb. 19, 2025, issued in Korean Application No. 10-2021-0005920.
European Office Action dated Sep. 10, 2024, issued in European Application No. 21 741 861.5-1201.
Chinese Office Action dated Oct. 28, 2024, issued in Chinese Application No. 202180009612.5.
Notification of Fulfilling of Registration Formality dated May 22, 2025, issued in Chinese Application No. 2021800096125.

* cited by examiner

ANTENNA MODULE COMPRISING FLOATING RADIATORS IN COMMUNICATION SYSTEM, AND ELECTRONIC DEVICE COMPRISING SAME

CROSS-REFERENCE TO RELATED APPLICATION(S)

This application is a continuation application, claiming priority under § 365(c), of an International application No. PCT/KR2021/000599, filed on Jan. 15, 2021, which is based on and claims the benefit of a U.S. Provisional application Ser. No. 62/961,754, filed on Jan. 16, 2020, in the U.S. Patent and Trademark Office, the disclosure of which is incorporated by reference herein in its entirety.

BACKGROUND

1. Field

The disclosure relates to a communication system. More particularly, the disclosure relates to an antenna module including multiple floating radiators, and an electronic device including the same.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna module structure for improving the side ratio and rear ratio of an antenna module of an electronic device in a communication system.

Another aspect of the disclosure is to provide an antenna module structure for improving the directivity of a beam radiated from an antenna module.

Another aspect of the disclosure is to provide an antenna module structure having a wide aperture for improving the directivity of a beam radiated from an antenna module.

Another aspect of the disclosure is to provide an antenna module structure for reducing surface waves of electromagnetic waves radiated from an antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a board, a plurality of antenna arrays arranged on the board, and a plurality of floating radiator arrays arranged to be spaced apart from the plurality of antenna arrays by a predetermined distance on the board. The plurality of floating radiator arrays are electromagnetically coupled to the plurality of antenna arrays.

A first floating radiator array among the plurality of floating radiator arrays may be disposed to be spaced apart from a first side of a first antenna array among the plurality of antenna arrays by a predetermined distance.

A second floating radiator array among the plurality of floating radiator arrays may be disposed to be spaced apart from a second side of the first antenna array among the plurality of antenna arrays by a predetermined distance.

The second floating radiator array may be disposed to be spaced apart from a first side of a second antenna array among the plurality of antenna arrays by a predetermined distance.

Each of the plurality of floating radiator arrays may include a plurality of floating radiators.

Each of the plurality of floating radiators may have a ring shape.

The ring shape may include at least one of a rectangular ring shape, a circular ring shape, and a diamond-shaped ring shape.

Each of the plurality of floating radiators may include a capacitor and first to fourth inductors.

A factor value of each of the capacitor and the first to fourth inductors may be determined according to at least one of a horizontal length, a vertical length, a thickness, and a line width of each of the plurality of floating radiators.

A first end of the first inductor may be electrically connected to a second end of the fourth inductor.

A second end of the first inductor may be electrically connected to a first end of the second inductor.

A second end of the second inductor may be electrically connected to a first end of the third inductor.

A third end of the second inductor may be electrically connected to a first end of the capacitor.

A second end of the third inductor may be electrically connected to the second end of the fourth inductor.

A third end of the fourth inductor may be electrically connected to a second end of the capacitor.

Each of the plurality of floating radiators may be a patch-type radiator.

The patch-type radiator may have at least one shape of a diamond shape and a rectangular patch shape.

The electronic device further includes a feeding circuit configured to supply an electrical signal to the plurality of antenna arrays. The plurality of antenna arrays may radiate a first electromagnetic wave, based on the electrical signal. The plurality of floating radiator arrays may be electromagnetically coupled to the plurality of antenna arrays, based on the first electromagnetic wave, so as to radiate a second electromagnetic wave.

A phase of the first electromagnetic wave may correspond to a phase of the second electromagnetic wave.

The phase of the first electromagnetic wave and the phase of the second electromagnetic wave may be determined according to at least one of a horizontal length, a vertical length, a thickness, and a line width of each of the plurality of floating radiators.

An electronic device according to the disclosure may improve communication performance by improving the side ratio and rear ratio of an antenna module.

An electronic device according to the disclosure may improve the directivity of a beam radiated from an antenna module.

An electronic device according to the disclosure may improve the directivity of a beam radiated from an antenna module by increasing the area of an aperture for radiating beams through multiple floating radiators.

An electronic device according to the disclosure may reduce surface waves of electromagnetic waves radiated from an antenna module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying communication nodes or access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 5GS and NR standard, which is the latest standard specified by the 3rd generation partnership project (3GPP) group among the existing communication standards, for the convenience of description. However, the disclosure is not limited by these terms and names, and may be applied in the same way to systems that conform other standards. In particular, the disclosure may be applied to 3GPP 5GS/NR (5th generation mobile communication standard).

Figure 1:
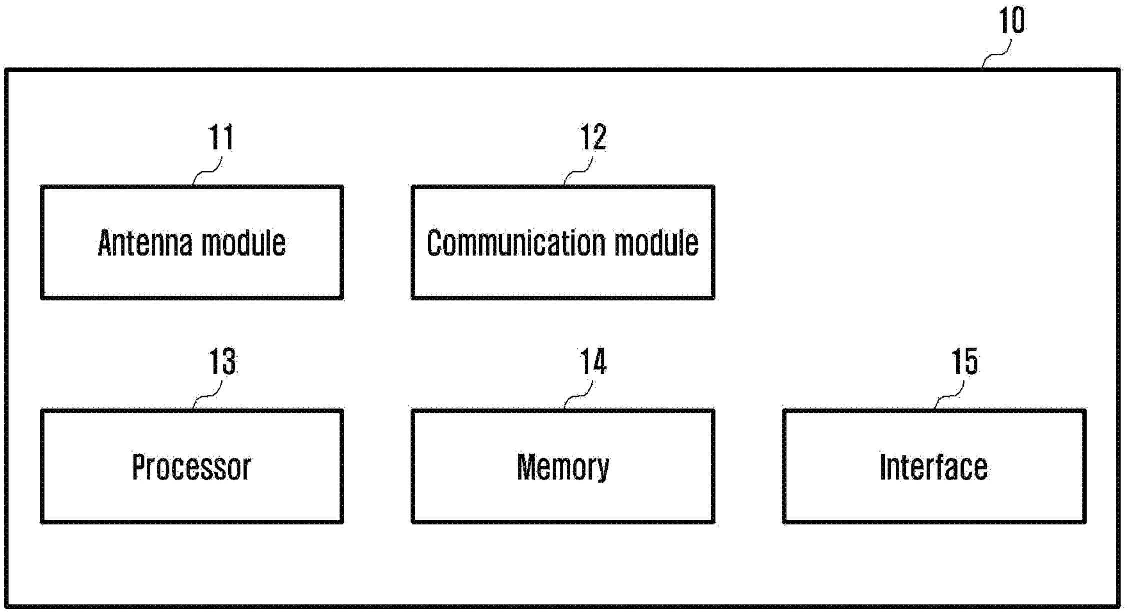
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 10 in the network environment may communicate with any other electronic device (not shown) or a server (not shown) via a network (e.g., a wired or wireless communication network). For example, the electronic device 10 may be a base station and the other electronic device may be a terminal.

According to an embodiment, the electronic device 10 may include an antenna module 11, a communication module 12, a processor 13, a memory 14, and an interface 15. In some embodiments, at least one of the components may be omitted from the electronic device 10, or one or more other components may be added in the electronic device 10. In some embodiments, some of the components may be integrated into a single element.

The processor 13 may control, for example, at least one other component (e.g., a hardware or software component) of the electronic device 10, coupled with the processor 13, and may perform various data processing or computation. According to one embodiment, as at least part of the data processing or computation, the processor 13 may store a command or data received from another component (e.g., the communication module 12) in the memory 14, process the command or the data stored in the memory 14, and store resulting data in the memory 14.

The memory 14 may store various data used by at least one component of the electronic device 10. The data may include, for example, software and input data or output data for a command related thereto.

The interface 15 may support one or more specified protocols that may be used for the electronic device 10 to be coupled directly or wirelessly with any other electronic device. According to another embodiment, the interface 15 may include, for example, a universal serial bus (USB) interface or a secure digital (SD) card interface.

The communication module 12 may support establishing a wired communication channel or a wireless communication channel between the electronic device 10 and any other electronic device and performing communication via the established communication channel. The communication module 12 may include one or more communication processors that are operable independently from the processor 13 and supports a wired communication or a wireless communication. According to yet another embodiment, the communication module 12 may communicate with any other electronic device or a server via a legacy cellular network, a 5G network, a next-generation communication network, the Internet, or a computer network (e.g., LAN or WAN). These various types of communication modules may be implemented as a single component (e.g., a single chip), or may be implemented as multi components (e.g., multi chips) separate from each other.

The communication module 12 may supports 5G network and next-generation communication technologies beyond the 4G network, for example, new radio (NR) access technology. The NR access technology may support high-speed transmission of high-capacity data (enhanced mobile broadband (eMBB)), terminal power minimization and multi-terminal access (massive machine type communications (mMTC)), or ultra-reliable and low-latency communications (URLLC). For example, the communication module 12 may support ultrahigh frequency (mmWave) bands so as to accomplish higher data rates. The communication module 12 may support various techniques for ensuring performance in the ultrahigh frequency bands, such as beamforming, massive multiple-input multiple-output (massive MIMO), full dimensional MIMO (FD-MIMO), array antenna, analog beam forming, large scale antenna techniques. The communication module 12 support various requirements specified for the electronic device 10, any other electronic device, or a network system.

The antenna module 11 may transmit or receive a signal or power to or from the outside (e.g., any other electronic device) of the electronic device 10. According to yet another embodiment, the antenna module 11 may include an antenna including a radiating element composed of a conductive material or a conductive pattern formed on a substrate (e.g., PCB). According to yet another embodiment, the antenna module 11 may include a plurality of antennas. In such a case, at least one antenna appropriate for a communication scheme used in a network may be selected, for example, by the communication module 12 from the plurality of antennas. The signal or the power may then be transmitted or received between the communication module 12 and any other external electronic device via the selected at least one antenna. According to some embodiments, another component (e.g., a radio frequency integrated circuit (RFIC)) other than the radiating element may be additionally formed as part of the antenna module 11.

According to various embodiments, the antenna module 11 may form a mmWave antenna module. According to yet another embodiment, the mmWave antenna module may include a printed circuit board, a RFIC disposed at a first surface (e.g., the lower surface) of the printed circuit board or adjacent thereto and capable of supporting specified high-frequency bands (e g, mmWave bands), and a plurality of antennas (e.g., an array antenna) disposed at a second surface (e.g., the upper or side surface) of the printed circuit board or adjacent thereto and capable of transmitting or receiving signals in the specified high-frequency bands.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 10 and any other external electronic device via a server coupled with a network. The other external electronic device may be a device of a same type as, or a different type, from the electronic device 10. According to yet another embodiment, all or some of operations to be executed at the electronic device 10 may be executed at the other external electronic device. For example, if the electronic device 10 should perform a function or a service automatically, or in response to a request from a user or another device, the electronic device 10, instead of, or in addition to, executing the function or the service, may request one or more other external electronic devices to perform at least part of the function or the service. The one or more other external electronic devices receiving the request may perform the at least part of the function or the service requested, or an additional function or an additional service related to the request, and transfer an outcome of the performing to the electronic device 10. The electronic device 10 may provide the outcome, with or without further processing of the outcome, as at least part of a reply to the request. To that end, a cloud computing, distributed computing, mobile edge computing (MEC), or client-server computing technology may be used, for example. The electronic device 10 may provide, for example, an ultra-low-latency service using distributed computing or MEC. In other embodiments, the other external electronic devices may include Internet of things (IoT) devices.

The electronic device according to various embodiments disclosed herein may be one of various types of electronic devices. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C” may include all possible combinations of the items enumerated together in a corresponding one of the phrases. As used herein, such terms as “a first”, “a second”, “the first”, and “the second” may be used to simply distinguish a corresponding element from another, and does not limit the elements in other aspect (e.g., importance or order). It is to be understood that if an element (e.g., a first element) is referred to, with or without the term “operatively” or “communicatively”, as “coupled with/to” or “connected with/to” another element (e.g., a second element), it means that the element may be coupled/connected with/to the other element directly (e.g., wiredly), wirelessly, or via a third element.

As used herein, the term “module” may include a unit implemented in hardware, software, or firmware, and may be interchangeably used with other terms, for example, “logic,” “logic block,” “component,” or “circuit”. The “module” may be a minimum unit of a single integrated component adapted to perform one or more functions, or a part thereof. For example, according to yet another embodiment, the “module” may be implemented in the form of an application-specific integrated circuit (ASIC).

Various embodiments as set forth herein may be implemented as software including one or more instructions that are stored in a storage medium (e.g., the memory 14) that is readable by a machine (e.g., the electronic device 10). For example, a processor (e.g., the processor 13) of the machine (e.g., the electronic device 10) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to yet another embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 2:
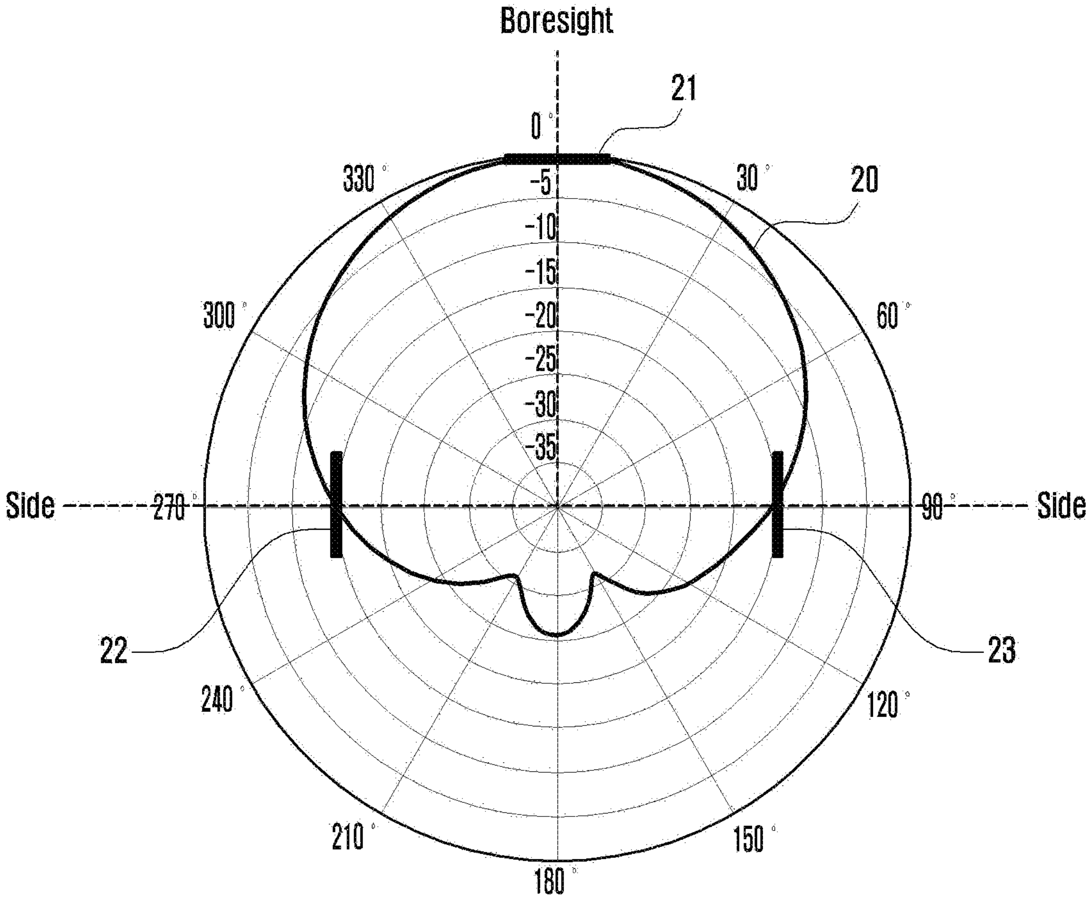
FIG. 2 is a graph illustrating antenna gain of an antenna module of the electronic device 10, according to an embodiment of the disclosure.

FIG. 2 is a graph illustrating antenna gain of an antenna module of an electronic device, according to an embodiment of the disclosure.

Referring to FIG. 2, in a graph 20 of antenna gain for an electromagnetic wave radiated from the antenna module 11 of the electronic device 10, a value 21 in a front direction and values 22 and 23 in a lateral direction may be different from each other. A side ratio of an antenna may be defined as a difference between an antenna gain value 21 with respect to the front direction and an antenna gain value 21 or 22 with respect to the lateral direction of the electromagnetic wave radiated from the antenna module 11.

For example, the antenna module 11 may include a plurality of antenna arrays. In this case, when the amount of electromagnetic waves radiated from one antenna array in the lateral direction is small, the influence on another antenna array positioned on a side surface of the one antenna array may be reduced. For example, when a side ratio for each of the plurality of antenna arrays of the antenna module 11 is reduced, the mutual influence of the plurality of antenna arrays may be reduced.

The antenna module 11 of the electronic device 10 according to various embodiments may have a structure which reduces a side ratio. For example, the structure of the antenna module 11 may be as shown in FIG. 3.

Figure 3:
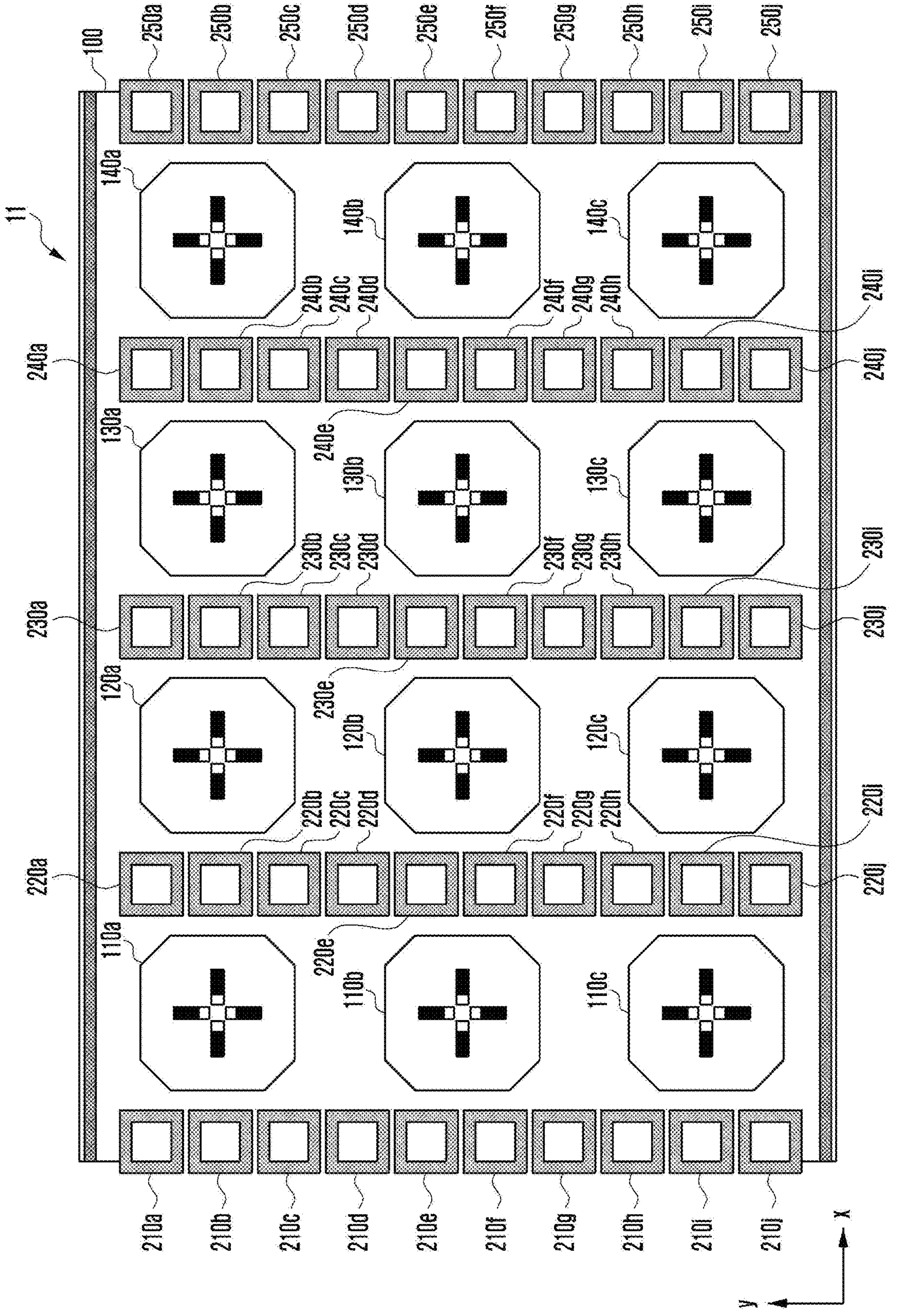
FIG. 3 is a top view of an antenna module of an electronic device, according to an embodiment of the disclosure.

FIG. 3 is a top view of an antenna module of an electronic device 10, according to an embodiment of the disclosure.

Figure 4:
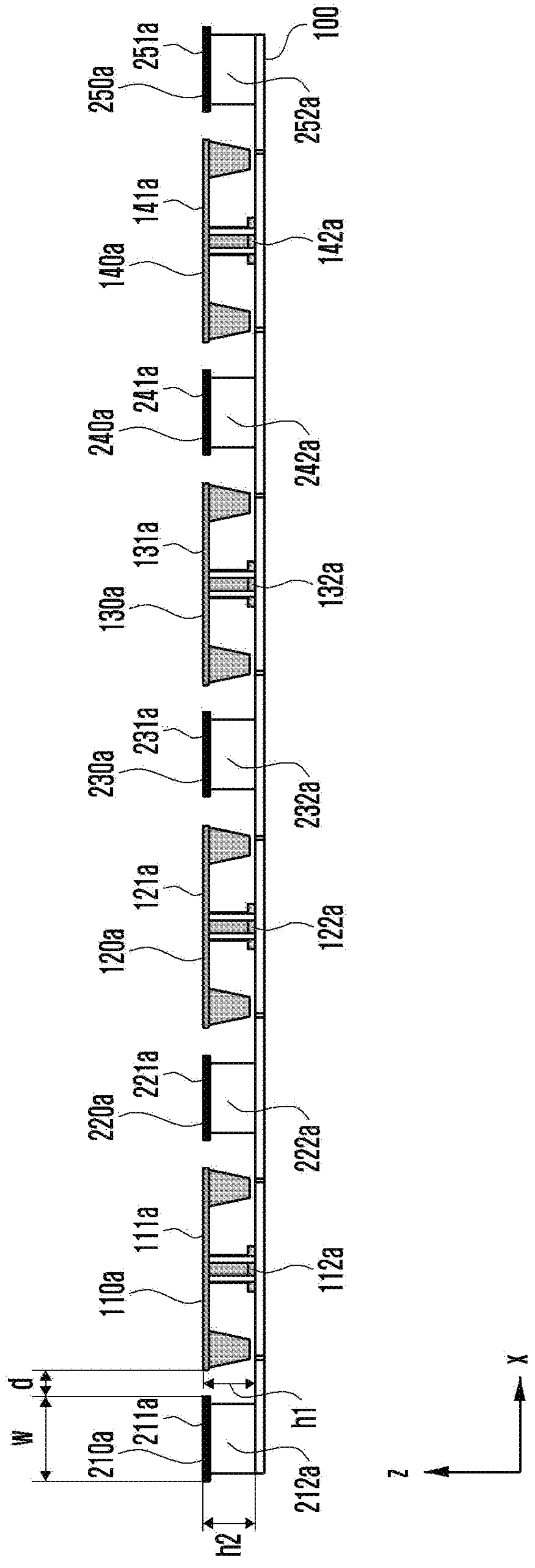
FIG. 4 is a side view of an antenna module of an electronic device, according to an embodiment of the disclosure.

FIG. 4 is a side view of an antenna module of an electronic device, according to an embodiment of the disclosure.

Referring to FIGS. 3 and 4, the antenna module 11 may include a board 100, a plurality of antenna elements 110*a* to 140*c*, and a plurality of floating radiators 210*a* to 250*c*.

The plurality of antenna elements 110*a*-110*c*, 120*a*-120*c*, 130*a*-130*c* and 140*a*-140*c* may be disposed on an upper surface of the board 100. First antenna elements 110*a* to 110*c* may be disposed in a first column of the board 100. A 1*a*-th antenna element 110*a* may be disposed in a first row of the first column of the board 100. The 1*a*-th antenna element 110*a* may include a 1*a*-th body 111*a* and a 1*a*-th supporter 112*a*.

A 1*b*-th antenna element 110*b* may be disposed in a second row of the first column of the board 100. The 1*b*-th antenna element 110*b* may include a 1*b*-th body 111*b* and a 1*b*-th supporter 112*b*.

A 1*c*-th antenna element 110*c* may be disposed in a third row of the first column of the board 100. The 1*c*-th antenna element 110*c* may include a 1*c*-th body 111*c* and a 1*c*-th supporter 112*c*.

Second antenna elements 120*a* to 120*c* may be disposed in a second column of the board 100. A 2*a*-th antenna element 120*a* may be disposed in a first row of the second column of the board 100. The 2*a*-th antenna element 120*a* may include a 2*a*-th body 121*a* and a 2*a*-th supporter 122*a*.

A 2*b*-th antenna element 120*b* may be disposed in a second row of the second column of the board 100. The 2*b*-th antenna element 120*b* may include a 2*b*-th body 121*b* and a 2*b*-th supporter 122*b*.

A 2*c*-th antenna element 120*c* may be disposed in a third row of the second column of the board 100. The 2*c*-th antenna element 120*c* may include a 2*c*-th body 121*c* and a 2*c*-th supporter 122*c*.

Third antenna elements 130*a* to 130*c* may be disposed in a third column of the board 100. A 3*a*-th antenna element 130*a* may be disposed in a first row of the third column of the board 100. The 3*a*-th antenna element 130*a* may include a 3*a*-th body 131*a* and a 3*a*-th supporter 132*a*.

A 3*b*-th antenna element 130*b* may be disposed in a second row of the third column of the board 100. The 3*b*-th antenna element 130*b* may include a 3*b*-th body 131*b* and a 3*b*-th supporter 132*b*.

A 3*c*-th antenna element 130*c* may be disposed in a third row of the third column of the board 100. The 3*c*-th antenna element 130*c* may include a 3*c*-th body 131*c* and a 3*c*-th supporter 132*c*.

Fourth antenna elements 140*a* to 140*c* may be disposed in a fourth column of the board 100. A 4*a*-th antenna element 140*a* may be disposed in a first row of the fourth column of the board 100. The 4*a*-th antenna element 140*a* may include a 4*a*-th body 141*a* and a 4*a*-th supporter 142*a*.

A 4*b*-th antenna element 140*b* may be disposed in a second row of the fourth column of the board 100. The 4*b*-th antenna element 140*b* may include a 4*b*-th body 141*b* and a 4*b*-th supporter 142*b*.

A 4*c*-th antenna element 140*c* may be disposed in a third row of the fourth column of the board 100. The 4*c*-th antenna element 140*c* may include a 4*c*-th body 141*c* and a 4*c*-th supporter 142*c*.

A plurality of floating radiators 210*a*-210*j*, 220*a*-220*j*, 230*a*-230*j*, 240*a*-240*j* and 250*a*-250*j* may be disposed on the upper surface of the board 100. For example, first floating radiators 210*a* to 210*j* may be disposed on the left side of the first antenna elements 110*a* to 110*c* on the upper surface of the board 100. For example, the first floating radiators 210*a* to 210*j* may be spaced apart from the first antenna elements 110*a* to 110*c* by a predetermined distance.

Second floating radiators 220*a* to 220*j* may be disposed between the first antenna elements 110*a* to 110*c* and the second antenna elements 120*a* to 120*c* on the upper surface of the board 100. For example, the second floating radiators 220*a* to 220*j* may be disposed on the right side of the first antenna elements 110*a* to 110*c*. The second floating radiators 220*a* to 220*j* may be spaced apart from the first antenna elements 110*a* to 110*c* by a predetermined distance. The second floating radiators 220*a* to 220*j* may be disposed on the left side of the second antenna elements 120*a* to 120*c*. The second floating radiators 220*a* to 220*j* may be spaced apart from the second antenna elements 120*a* to 120*c* by a predetermined distance.

Third floating radiators 230*a* to 230*j* may be disposed between the second antenna elements 120*a* to 120*c* and the third antenna elements 130*a* to 130*c* on the upper surface of the board 100. For example, the third floating radiators 230*a* to 230*j* may be disposed on the right side of the second antenna elements 120*a* to 120*c*. The third floating radiators 230*a* to 230*j* may be spaced apart from the second antenna elements 120*a* to 120*c* by a predetermined distance. The third floating radiators 230*a* to 230*j* may be disposed on the left side of the third antenna elements 130*a* to 130*c*. The third floating radiators 230*a* to 230*j* may be spaced apart from the third antenna elements 130*a* to 130*c* by a predetermined distance.

Fourth floating radiators 240*a* to 240*j* may be disposed between the third antenna elements 130*a* to 130*c* and the fourth antenna elements 140*a* to 140*c* on the upper surface of the board 100. For example, the fourth floating radiators 240*a* to 240*j* may be disposed on the right side of the third antenna elements 130*a* to 130*c*. The fourth floating radiators 240*a* to 240*j* may be spaced apart from the third antenna elements 130*a* to 130*c* by a predetermined distance. The fourth floating radiators 240*a* to 240*j* may be disposed on the left side of the fourth antenna elements 140*a* to 140*c*. The fourth floating radiators 240*a* to 240*j* may be spaced apart from the fourth antenna elements 140*a* to 140*c* by a predetermined distance.

Fifth floating radiators 250*a* to 250*j* may be disposed on the left side of the fourth antenna elements 140*a* to 140*c* on the upper surface of the board 100. The fifth floating radiators 250*a* to 250*j* may be spaced apart from the fourth antenna elements 140*a* to 140*c* by a predetermined distance.

The directivity of a beam radiated from the antenna module 11 may be proportional to the width of an aperture of the antenna module 11 radiating the beam. For example, as the aperture of the antenna module 11 increases, the width of a beam radiated from the antenna module 11 may be reduced.

The antenna module 11 may increase the aperture of the antenna module 11 through the plurality of floating radiators 210*a* to 250*c*. That is, the antenna module 11 may reduce the width of a beam radiated from the antenna module 11 through the plurality of floating radiators 210*a* to 250*c*. Accordingly, the antenna module 11 may increase the directivity of a beam radiated from the antenna module 11 through the plurality of floating radiators 210*a* to 250*c*.

In addition, the antenna module 11 may reduce a surface wave caused by an electromagnetic wave radiated from the plurality of antenna elements 110*a* to 140*c* through the plurality of floating radiators 210*a* to 250*c*.

Referring to FIG. 4, an upper surface of the 1*a*-th antenna element 110*a* may be spaced apart from the upper surface of the board 100 by a predetermined distance h1. A 1*a*-th floating radiator 210*a* may be disposed to be spaced apart from the left side of the 1*a*-th antenna element 110*a* by a predetermined distance d on the board 100. An upper surface of the 1*a*-th floating radiator 210*a* may be spaced apart from the upper surface of the board 100 by a predetermined distance h2. A horizontal width w of the 1*a*-th floating radiator 210*a* may have a predetermined size.

Figure 5:
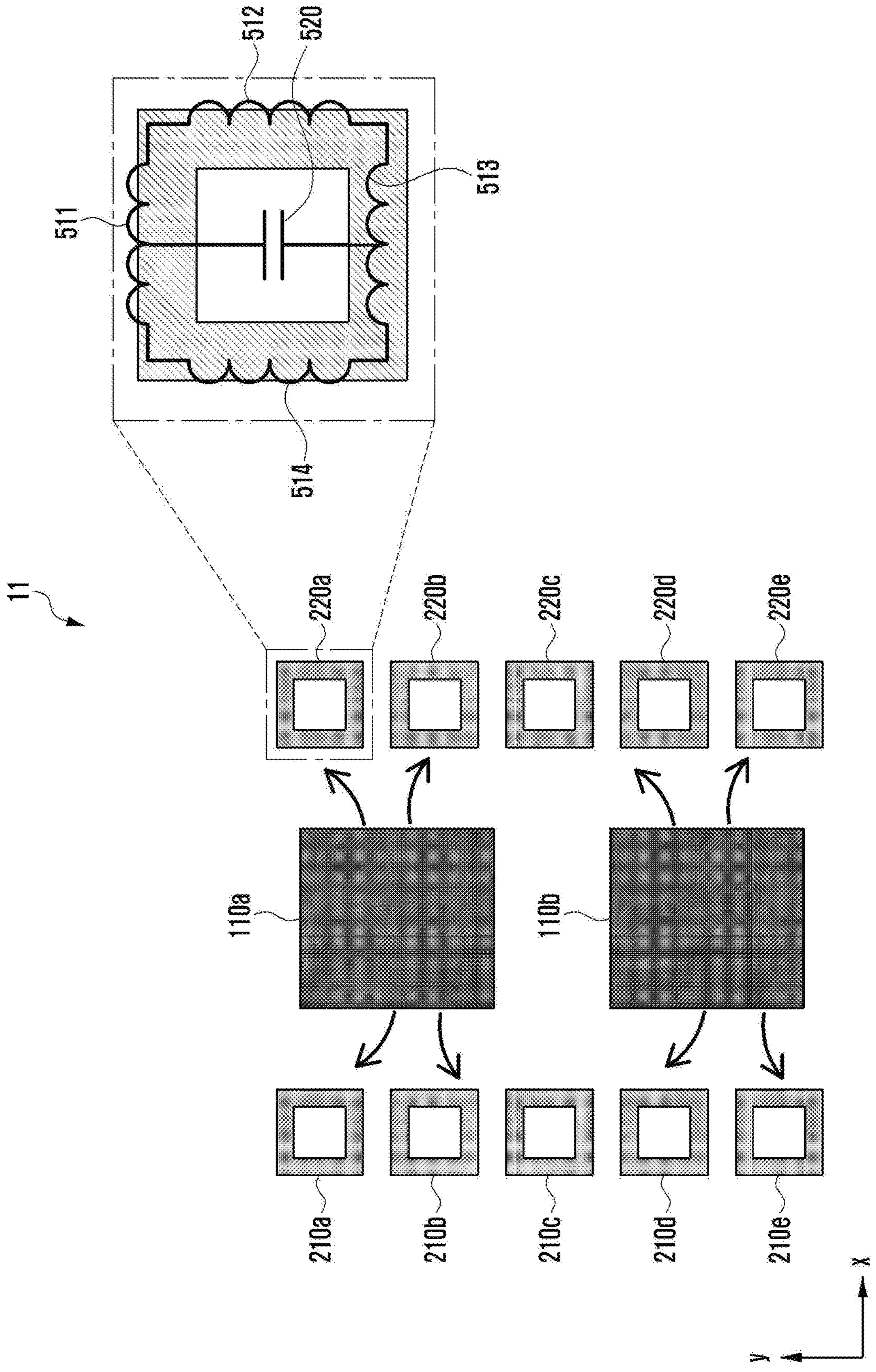
FIG. 5 is a top view of an antenna module of an electronic device, according to an embodiment of the disclosure.

FIG. 5 is a top view of an antenna module of an electronic device, according to an embodiment of the disclosure.

Referring to FIG. 5, the plurality of floating radiators 210*a* to 210*e* and 220*a* to 220*e* of the antenna module 11 may be electromagnetically coupled to the plurality of antenna elements 110*a* to 110*b*.

For example, the plurality of antenna elements 110*a* to 110*b* may radiate a first electromagnetic wave. An electromagnetic field may be induced in the plurality of floating radiators 210*a* to 210*e* and 220*a* to 220*e* by the first electromagnetic wave radiated from the plurality of antenna elements 110*a* to 110*b*. For example, the plurality of floating radiators 210*a* to 210*e* and 220*a* to 220*e* may radiate a second electromagnetic wave due to the electromagnetic field induced by the first electromagnetic wave.

The antenna module 11 may have a wider aperture due to the plurality of floating radiators 210*a* to 210*e* and 220*a* to 220*e*. The antenna module 11 may radiate a beam, based on the first electromagnetic wave and the second electromagnetic wave. For example, the width of a beam radiated from the antenna module 11 may be narrowed by the first electromagnetic wave and the second electromagnetic wave.

The plurality of floating radiators 210*a* to 210*e* and 220*a* to 220*e* may prevent the first electromagnetic wave radiated from the plurality of antenna elements 110*a* to 110*b* from propagating to the surface of the antenna module 11. For example, the plurality of floating radiators 210*a* to 210*e* and 220*a* to 220*e* may reduce the influence of a surface wave caused by the first electromagnetic wave.

The plurality of floating radiators 210*a* to 210*e* and 220*a* to 220*e* may have a capacitance factor and an inductance factor. For example, a 2*a*-th floating radiator 220*a* may have a plurality of inductance factors and a capacitance factor. For example, an inductance factor may be referred to as an inductor. A capacitance factor may be referred to as a capacitor. For example, the 2*a*-th floating radiator 220*a* may include a plurality of inductors 511 to 514 and a capacitor 520. A first end of a first inductor 511 may be electrically connected to a first end of a fourth inductor 514. A second end of the first inductor 511 may be electrically connected to a first end of a second inductor 512. A second end of the second inductor 512 may be electrically connected to a first end of a third inductor 513. A second end of the third inductor 513 may be electrically connected to the first end of the fourth inductor 514. One end of the capacitor 520 may be electrically connected to a third end of the first inductor 511. One end of the capacitor 520 may be electrically connected to a third end of the third inductor 513.

A capacitance factor and an inductance factor of each of the plurality of floating radiators 210*a* to 210*e* and 220*a* to 220*e* may be determined according to at least one of a horizontal length, a vertical length, a thickness, and a line width of each of the plurality of floating radiators 210*a* to 210*e* and 220*a* to 220*e*. For example, a factor value of each of a plurality of inductors 511 to 514 and a capacitor 520 may be determined according to at least one of a horizontal length, a vertical length, a thickness, and a line width of the 2*a*-th floating radiator 220*a*. For example, an imaginary component of the factor value of each of the plurality of inductors 511 to 514 and the capacitor 520 may be determined according to at least one of the horizontal length, the vertical length, the thickness, and the line width of the 2*a*-th floating radiator 220*a*. For example, an imaginary component of an inductance value of each of the plurality of inductors 511 to 514 and an imaginary component of a capacitance value of the capacitor 520 may be determined according to at least one of the horizontal length, the vertical length, the thickness, and the line width of the 2*a*-th floating radiator 220*a*.

A phase of a second electromagnetic wave radiated from the 2*a*-th floating radiator 220*a* may be determined based on the imaginary component of the factor value of each of the plurality of inductors 511 to 514 and the capacitor 520. That is, the phase of the second electromagnetic wave radiated from the 2*a*-th floating radiator 220*a* may be determined based on at least one of the horizontal length, the vertical length, the thickness, and the line width of the 2*a*-th floating radiator 220*a*. At least one of the horizontal length, the vertical length, the thickness, and the line width of the 2*a*-th floating radiator 220*a* may be determined such that a phase of a second electromagnetic wave is the same as a phase of a first electromagnetic wave.

Figure 6:
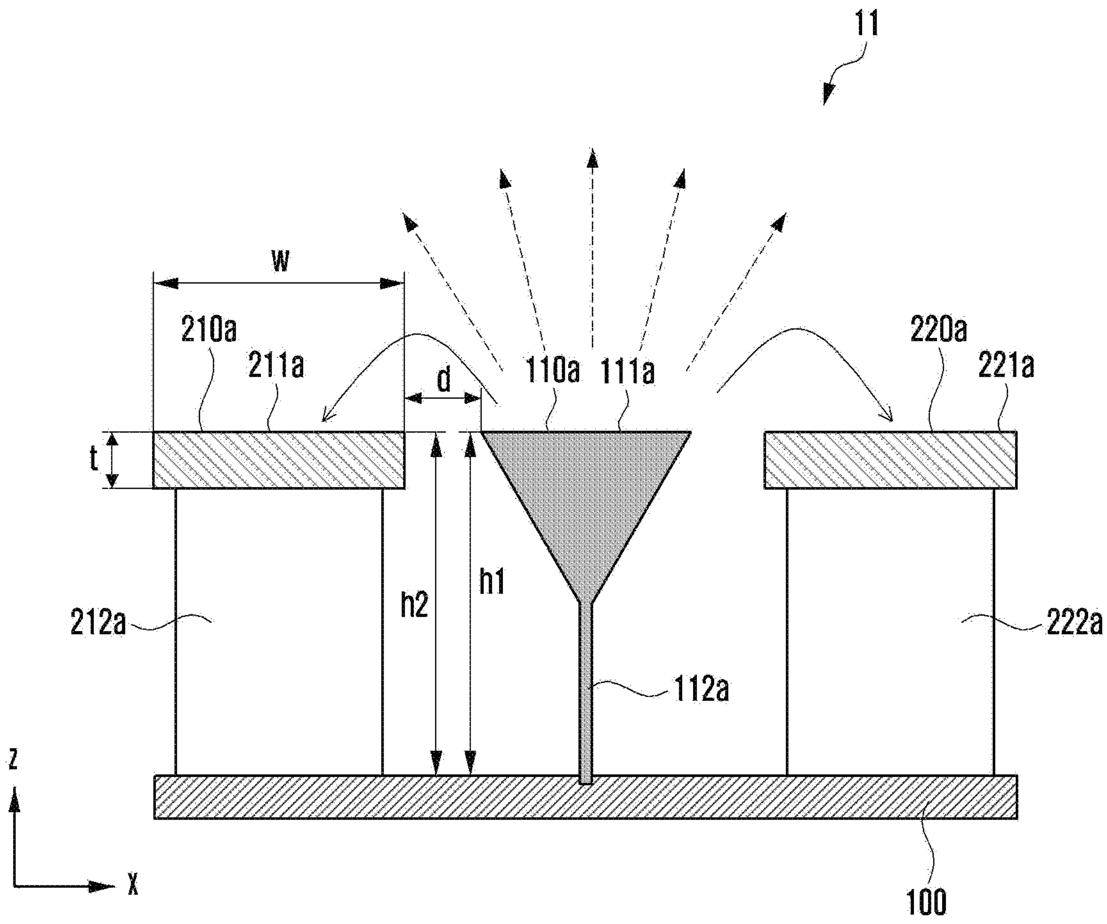
FIG. 6 is a side view of an antenna module of an electronic device, according to an embodiment of the disclosure.

FIG. 6 is a side view of an antenna module of an electronic device, according to an embodiment of the disclosure.

Referring to FIG. 6, an upper surface of the body 111*a* of the 1*a*-th antenna element 110*a* of the antenna module 11 may be spaced apart from the upper surface of the board 100 by a predetermined distance h1.

The 1*a*-th floating radiator 210*a* may include a 1*a*-th body 211*a* and a 1*a*-th supporter 212*a*. For example, the 1*a*-th supporter 212*a* may be disposed on the upper surface of the board 100. Alternatively, the 1*a*-th supporter 212*a* may be integrally injected with the board 100.

The 1*a*-th body 211*a* may be disposed on an upper surface of the 1*a*-th supporter 212*a*. The 1*a*-th body 211*a* may be disposed to be spaced apart from the left side of the 1*a*-th antenna element 110*a* by a predetermined distance d on the board 100. An upper surface of the 1*a*-th body 211*a* may be spaced apart from the upper surface of the board 100 by a predetermined distance h2.

A factor value of each of the plurality of inductors 511 to 514 and the capacitor 520 of FIG. 5 may be determined based on a thickness t and a length w of a horizontal or vertical width of the 1*a*-th body 211*a*. For example, an imaginary component of the factor value of each of the plurality of inductors 511 to 514 and the capacitor 520 may be determined according to at least one of the thickness t and the length w of the horizontal or vertical width of the 1*a*-th body 211*a*. For example, an imaginary component of an inductance value of each of the plurality of inductors 511 to 514 and an imaginary component of a capacitance value of the capacitor 520 may be determined according to at least one of the thickness t and the length w of the horizontal or vertical width of the 1*a*-th body 211*a*.

A direction of a second electromagnetic wave radiated from the 1*a*-th floating radiator 210*a* may be determined based on the imaginary component of the factor value of each of the plurality of inductors 511 to 514 and the capacitor 520 of FIG. 5. That is, a phase of the second electromagnetic wave radiated from the 1*a*-th floating radiator 210*a* may be determined based on at least one of the thickness t and the length w of the horizontal or vertical width of the 1*a*-th body 211*a*. At least one of the thickness t and the length w of the horizontal or vertical width of the 1*a*-th body 211*a* may be determined such that a phase of a second electromagnetic wave is the same as a radiation direction of a first electromagnetic wave.

The 2*a*-th floating radiator 220*a* may include a 2*a*-th body 221*a* and a 2*a*-th supporter 222*a*. For example, the 2*a*-th supporter 222*a* may be disposed on the upper surface of the board 100. Alternatively, the 2*a*-th supporter 222*a* may be integrally injected with the board 100.

The 2*a*-th body 221*a* may be disposed on an upper surface of the 2*a*-th supporter 222*a*. The 2*a*-th body 221*a* may be disposed to be spaced apart from the right side of the 1*a*-th antenna element 110*a* by a predetermined distance d on the board 100. An upper surface of the 2*a*-th body 221*a* may be spaced apart from the upper surface of the board 100 by a predetermined distance.

A distance h1 from the upper surface of the board 100 to the upper surface of the body 111*a* of the 1*a*-th antenna element 110*a*, a distance h2 from the upper surface of the board 100 to the upper surface of the 1*a*-th body 211*a* of the 1*a*-th floating radiator 210*a*, and a distance from the upper surface of the board 100 to the upper surface of the 2*a*-th body 221*a* of the 2*a*-th floating radiator 220*a* may be the same or similar. Alternatively, the distance h1 from the upper surface of the board 100 to the upper surface of the body 111*a* of the 1*a*-th antenna element 110*a*, the distance h2 from the upper surface of the board 100 to the upper surface of the 1*a*-th body 211*a* of the 1*a*-th floating radiator 210*a*, and the distance from the upper surface of the board 100 to the upper surface of the 2*a*-th body 221*a* of the 2*a*-th floating radiator 220*a* may be different from each other.

The 1*a*-th antenna element 110*a* may radiate a first electromagnetic wave. For example, the first electromagnetic wave may be radiated from the 1*a*-th antenna element 110*a* on an x-axis, a y-axis, and a z-axis. A component radiated on the x-axis from the first electromagnetic wave may induce an electromagnetic field in the 1*a*-th floating radiator 210*a* and the 2*a*-th floating radiator 220*a*. For example, the 1*a*-th floating radiator 210*a* may re-radiate an electromagnetic wave, based on the first electromagnetic wave. In addition, the 2*a*-th floating radiator 220*a* may re-radiate an electromagnetic wave, based on the first electromagnetic wave.

For example, an electromagnetic field may be induced in the 1*a*-th floating radiator 210*a* by the first electromagnetic wave radiated from the 1*a*-th antenna element 110*a*. The 1*a*-th floating radiator 210*a* may radiate a second electromagnetic wave by the induced electromagnetic field.

An electromagnetic field may be induced in the 2*a*-th floating radiator 220*a* by the first electromagnetic wave radiated from the 1*a*-th antenna element 110*a*. The 2*a*-th floating radiator 220*a* may radiate a second electromagnetic wave by the induced electromagnetic field.

Figure 7:
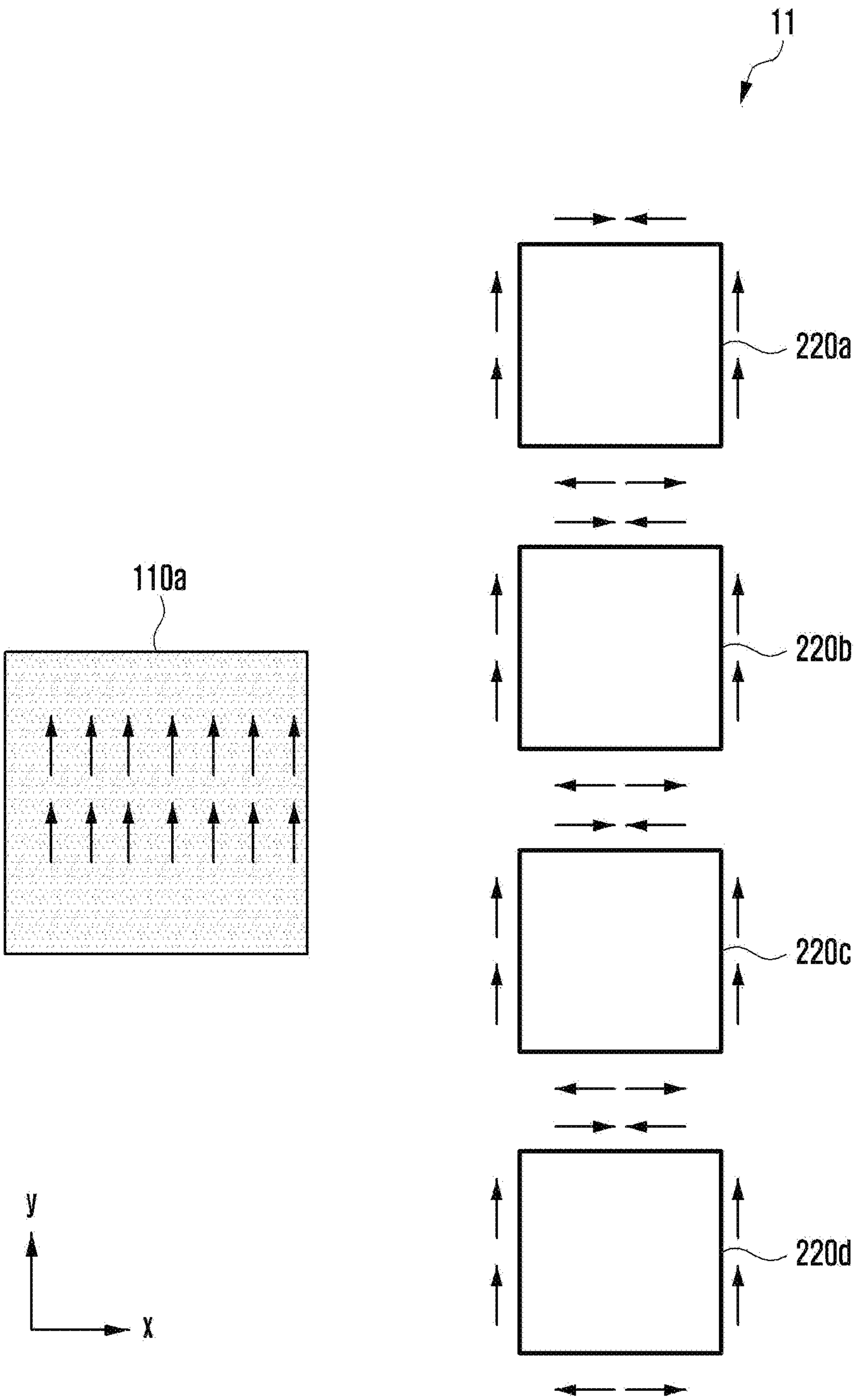
FIG. 7 is a conceptual diagram illustrating a flow of a current in an antenna module of an electronic device, according to an embodiment of the disclosure.

FIG. 7 is a conceptual diagram illustrating the flow of a current in the antenna module 11 of the electronic device 10, according to an embodiment of the disclosure.

Referring to FIG. 7, in the antenna module 11, the plurality of floating radiators 220*a* to 220*d* may be electromagnetically coupled to the 1*a*-th antenna element 110*a*.

For example, an electromagnetic field may be induced in each of the plurality of floating radiators 220*a* to 220*d* by a first electromagnetic wave radiated from the 1*a*-th antenna element 110*a*. Each of the plurality of floating radiators 220*a* to 220*d* in which the electromagnetic field is induced by the first electromagnetic wave may radiate a second electromagnetic wave by the electromagnetic field.

For example, the 1*a*-th floating radiator 220*a* may radiate a second electromagnetic wave by an electromagnetic field induced from the 1*a*-th antenna element 110*a*. A 1*b*-th floating radiator 220*b* may radiate a second electromagnetic wave by the electromagnetic field induced from the 1*a*-th antenna element 110*a*. A 1*c*-th floating radiator 220*c* may radiate a second electromagnetic wave by the electromagnetic field induced from the 1*a*-th antenna element 110*a*. A 1*d*-th floating radiator 220*d* may radiate a second electromagnetic wave by the electromagnetic field induced from the 1*a*-th antenna element 110*a*.

Figure 8:
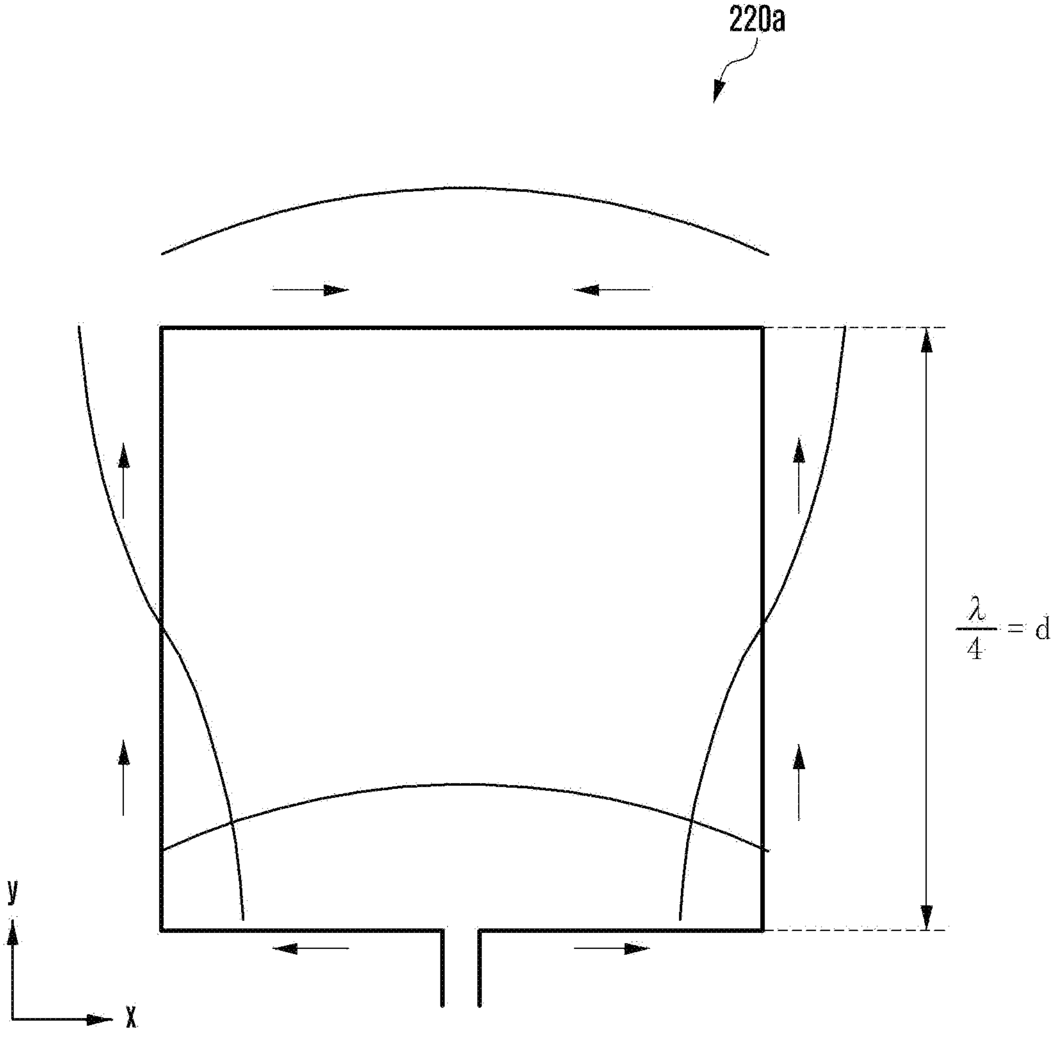
FIG. 8 is a conceptual diagram illustrating the flow of a current in at least one floating radiator among a plurality of floating radiators of an antenna module of an electronic device, according to an embodiment of the disclosure.

FIG. 8 is a conceptual diagram illustrating the flow of a current in at least one floating radiator among a plurality of floating radiators of an antenna module of an electronic device, according to an embodiment of the disclosure.

Referring to FIG. 8, at least one floating radiator among the plurality of floating radiators 210*a* to 250*c* may be designed in a wavelength loop manner. For example, the 2*a*-th floating radiator 220*a* may be designed in the wavelength loop manner. The 2*a*-th floating radiator 220*a* designed in the wavelength loop manner may operate as a radiator.

For example, a horizontal or vertical length d of the 2*a*-th floating radiator 220*a* may be determined based on a length λ of wavelength of a first electromagnetic wave radiated from the 1*a*-th antenna element 110*a*. For example, the horizontal or vertical length d of the 2*a*-th floating radiator 220*a* may be ¼ of the length λ of the wavelength of the first electromagnetic wave radiated from the 1*a*-th antenna element 110*a*. For example, a total length d*4 of the 2*a*-th floating radiator 220*a* may be the same as the length λ of the wavelength of the first electromagnetic wave radiated from the 1*a*-th antenna element 110*a*.

For example, the polarization of the first electromagnetic wave radiated from the 1*a*-th antenna element 110*a* may be in a z-axis direction or close to the z-axis direction with reference to the upper surface of the 1*a*-th antenna element 110*a*. In this case, a horizontal component of a current in an electromagnetic field induced in the 2*a*-th floating radiator 220*a* having a horizontal or vertical length of λ/4 may be extinguished by mutual interference between upper and lower surfaces of the 2*a*-th floating radiator 220*a*. Therefore, in the electromagnetic field induced in the 2*a*-th floating radiator 220*a*, the horizontal component of the current may be extinguished and only a vertical component may exist.

For example, a direction of a current of the 1*a*-th antenna element 110*a* may be the same as or similar to a direction of a current flowing through the 2*a*-th floating radiator 220*a*. For example, the antenna module 11 may have a wider aperture due to the plurality of floating radiators 210*a* to 250*c* and the plurality of antenna elements 110*a* to 140*c* having the same or similar current direction.

A shape and size of each of the plurality of floating radiators 210*a* to 250*j* may be the same as or similar to a shape and size of at least one of the floating radiators of FIGS. 9 to 13.

Figure 9:
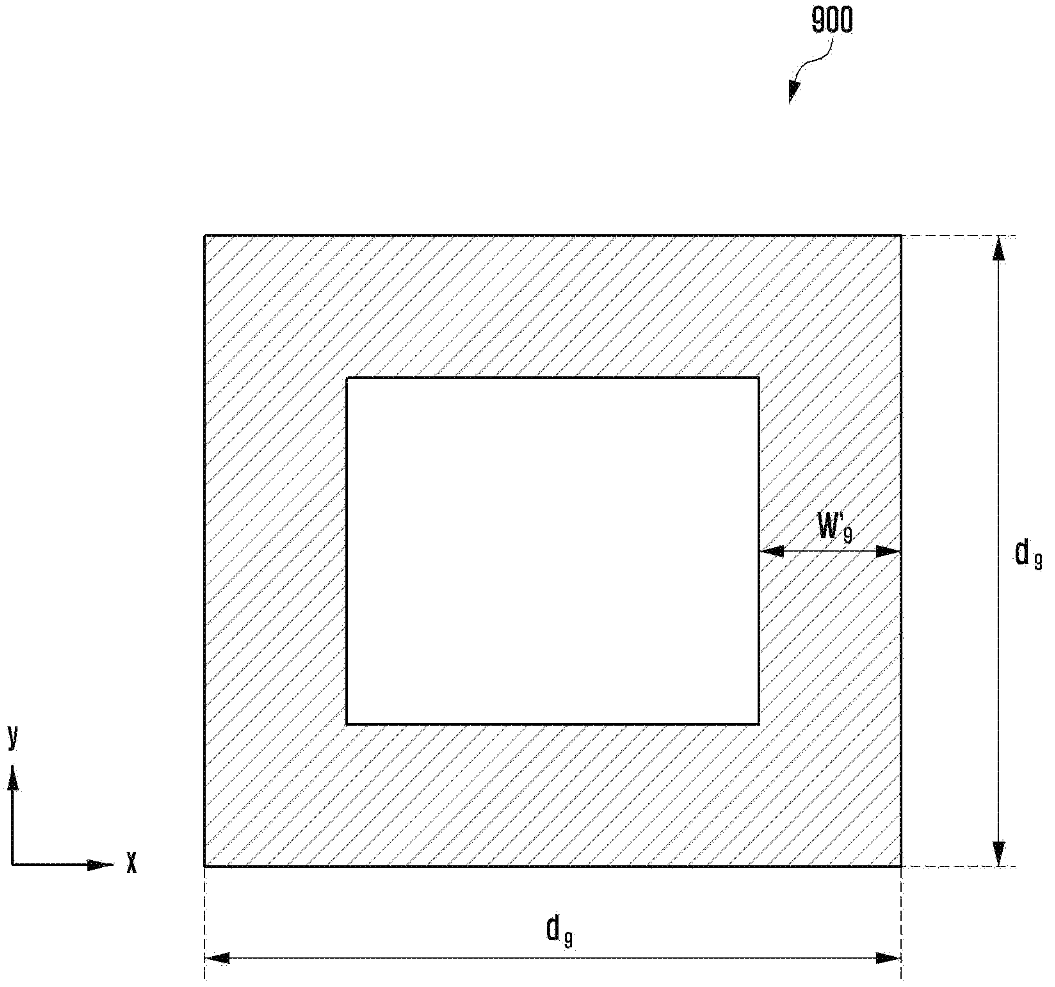
FIG. 9 is a conceptual diagram illustrating at least one floating radiator among a plurality of floating radiators of an antenna module of an electronic device, according to an embodiment of the disclosure.

FIG. 9 is a conceptual diagram illustrating at least one floating radiator among a plurality of floating radiators of an antenna module of an electronic device, according to an embodiment of the disclosure.

Referring to FIG. 9, a floating radiator 900 may have a rectangular ring shape. The floating radiator 400 may be the same as or similar to at least one of the plurality of floating radiators 210*a* to 250*j* of FIG. 3.

For example, a horizontal length w9, a vertical length d9, and a line width w'9 of the floating radiator 900 may be determined based on the magnitude of wavelength of an electromagnetic field output from the plurality of antenna elements 110*a* to 140*c* of FIG. 3.

A factor value of each of the plurality of inductors 511 to 514 and the capacitor 520 of FIG. 5 may be determined according to at least one of the horizontal length w9, the vertical length d9, and the line width w'9 of the floating radiator 900. For example, an imaginary component of the factor value of each of the plurality of inductors 511 to 514 and the capacitor 520 may be determined according to at least one of the horizontal length w9, the vertical length d9, and the line width w'9 of the floating radiator 900. For example, an imaginary component of an inductance value of each of the plurality of inductors 511 to 514 and an imaginary component of a capacitance value of the capacitor 520 may be determined according to at least one of the horizontal length w9, the vertical length d9, and the line width w'9 of the floating radiator 900.

A direction of a second electromagnetic wave radiated from the floating radiator 900 may be determined based on the imaginary component of the factor value of each of the plurality of inductors 511 to 514 and the capacitor 520 of FIG. 5. For example, the direction of the second electromagnetic wave radiated from the floating radiator 900 may be determined based on at least one of the horizontal length w9, the vertical length d9, and the line width w'9 of the floating radiator 900. At least one of the horizontal length w9, the vertical length d9, and the line width w'9 of the floating radiator 900 may be determined such that a radiation direction of a second electromagnetic wave radiated from the floating radiator 900 is the same as a radiation direction of a first electromagnetic wave radiated from the 1*a*-th antenna element 110*a*.

Figure 10:
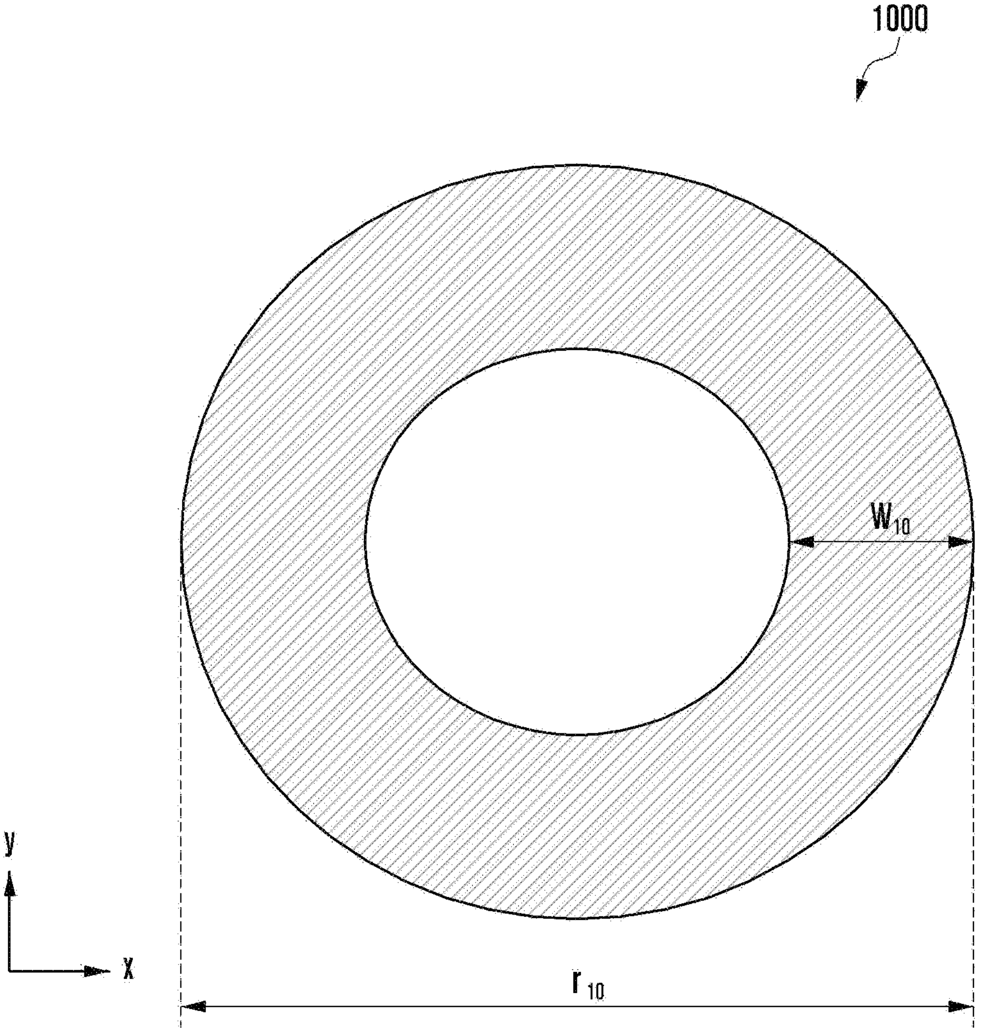
FIG. 10 is a conceptual diagram illustrating at least one floating radiator among a plurality of floating radiators of an antenna module of an electronic device, according to an embodiment of the disclosure.

FIG. 10 is a conceptual diagram illustrating at least one floating radiator among a plurality of floating radiators of an antenna module of an electronic device, according to an embodiment of the disclosure.

Referring to FIG. 10, a floating radiator 1000 may have a circular ring shape. The floating radiator 1000 may be the same as or similar to at least one of the plurality of floating radiators 210*a* to 250*j* of FIG. 3.

For example, a line width w10 and a length d10 of a diameter of the floating radiator 1000 may be determined based on the magnitude of wavelength of an electromagnetic field output from the plurality of antenna elements 110*a* to 140*c* of FIG. 3.

A factor value of each of the plurality of inductors 511 to 514 and the capacitor 520 of FIG. 5 may be determined according to at least one of the line width w10 and the length d10 of the diameter of the floating radiator 1000. For example, an imaginary component of the factor value of each of the plurality of inductors 511 to 514 and the capacitor 520 may be determined according to at least one of the line width w10 and the length d10 of the diameter of the floating radiator 1000. For example, an imaginary component of an inductance value of each of the plurality of inductors 511 to 514 and an imaginary component of a capacitance value of the capacitor 520 may be determined according to at least one of the line width w10 and the length d10 of the diameter of the floating radiator 1000.

A direction of a second electromagnetic wave radiated from the floating radiator 1000 may be determined based on the imaginary component of the factor value of each of the plurality of inductors 511 to 514 and the capacitor 520 of FIG. 5. For example, the direction of the second electromagnetic wave radiated from the floating radiator 1000 may be determined based on at least one of the line width w10 and the length d10 of the diameter of the floating radiator 1000. At least one of the line width w10 and the length d10 of the diameter of the floating radiator 1000 may be determined such that a radiation direction of a second electromagnetic wave radiated from the floating radiator 1000 is the same as a radiation direction of a first electromagnetic wave radiated from the 1*a*-th antenna element 110*a*.

Figure 11:
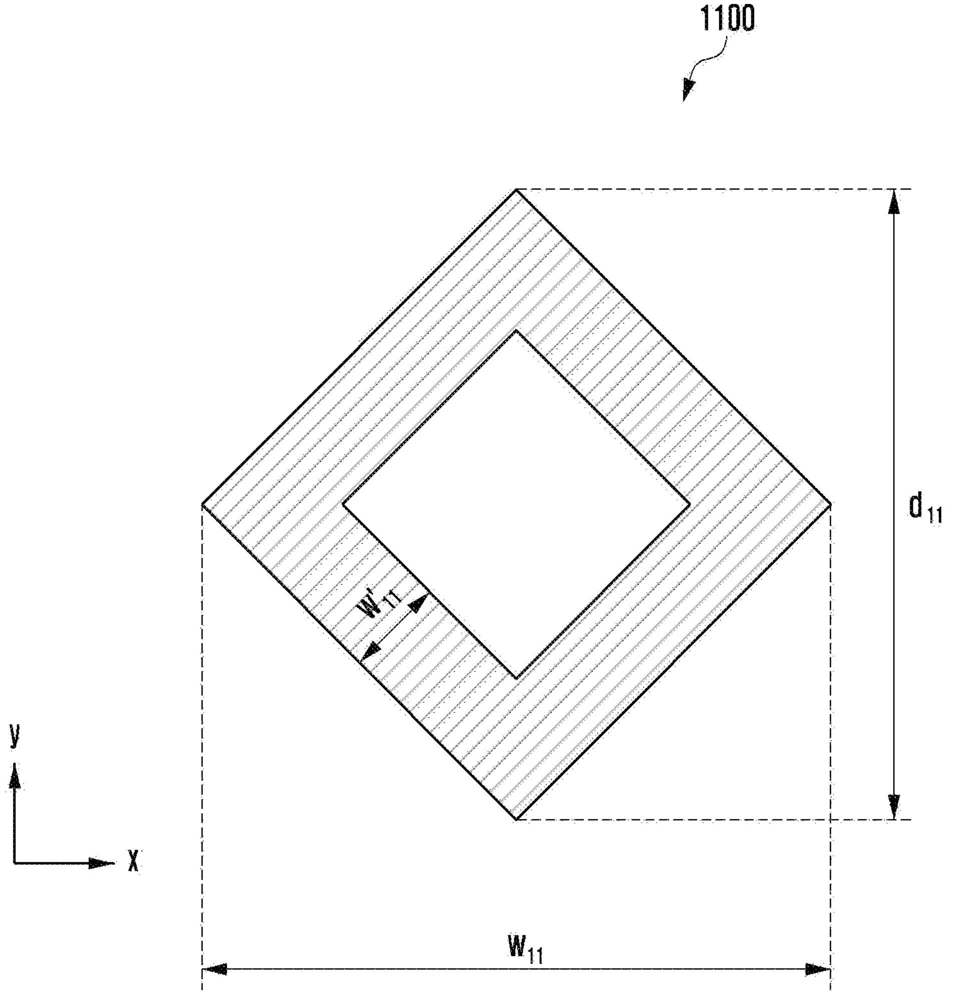
FIG. 11 is a conceptual diagram illustrating at least one floating radiator among a plurality of floating radiators of an antenna module of an electronic device, according to an embodiment of the disclosure.

FIG. 11 is a conceptual diagram illustrating at least one floating radiator among a plurality of floating radiators of an antenna module of an electronic device, according to an embodiment of the disclosure.

Referring to FIG. 11, a floating radiator 1100 may have a diamond-shaped ring shape. The floating radiator 1100 may be the same as or similar to at least one of the plurality of floating radiators 210*a* to 250*j* of FIG. 3.

For example, a horizontal length w11, a vertical length d11, and a line width w'11 of the floating radiator 1100 may be determined based on the magnitude of wavelength of an electromagnetic field output from the plurality of antenna elements 110*a* to 140*c* of FIG. 3.

A factor value of each of the plurality of inductors 511 to 514 and the capacitor 520 of FIG. 5 may be determined according to at least one of the horizontal length w11, the vertical length d11, and the line width w'11 of the floating radiator 1100. For example, an imaginary component of the factor value of each of the plurality of inductors 511 to 514 and the capacitor 520 may be determined according to at least one of the horizontal length w11, the vertical length d11, and the line width w'11 of the floating radiator 1100. For example, an imaginary component of an inductance value of each of the plurality of inductors 511 to 514 and an imaginary component of a capacitance value of the capacitor 520 may be determined according to at least one of the horizontal length w11, the vertical length d11, and the line width w'11 of the floating radiator 1100.

A direction of a second electromagnetic wave radiated from the floating radiator 1100 may be determined based on the imaginary component of the factor value of each of the plurality of inductors 511 to 514 and the capacitor 520 of FIG. 5. For example, the direction of the second electromagnetic wave radiated from the floating radiator 1100 may be determined based on at least one of the horizontal length w11, the vertical length d11, and the line width w'11 of the floating radiator 1100. At least one of the horizontal length w11, the vertical length d11, and the line width w'11 of the floating radiator 1100 may be determined such that a radiation direction of a second electromagnetic wave radiated from the floating radiator 1100 is the same as a radiation direction of a first electromagnetic wave radiated from the 1*a*-th antenna element 110*a*.

Figure 12:
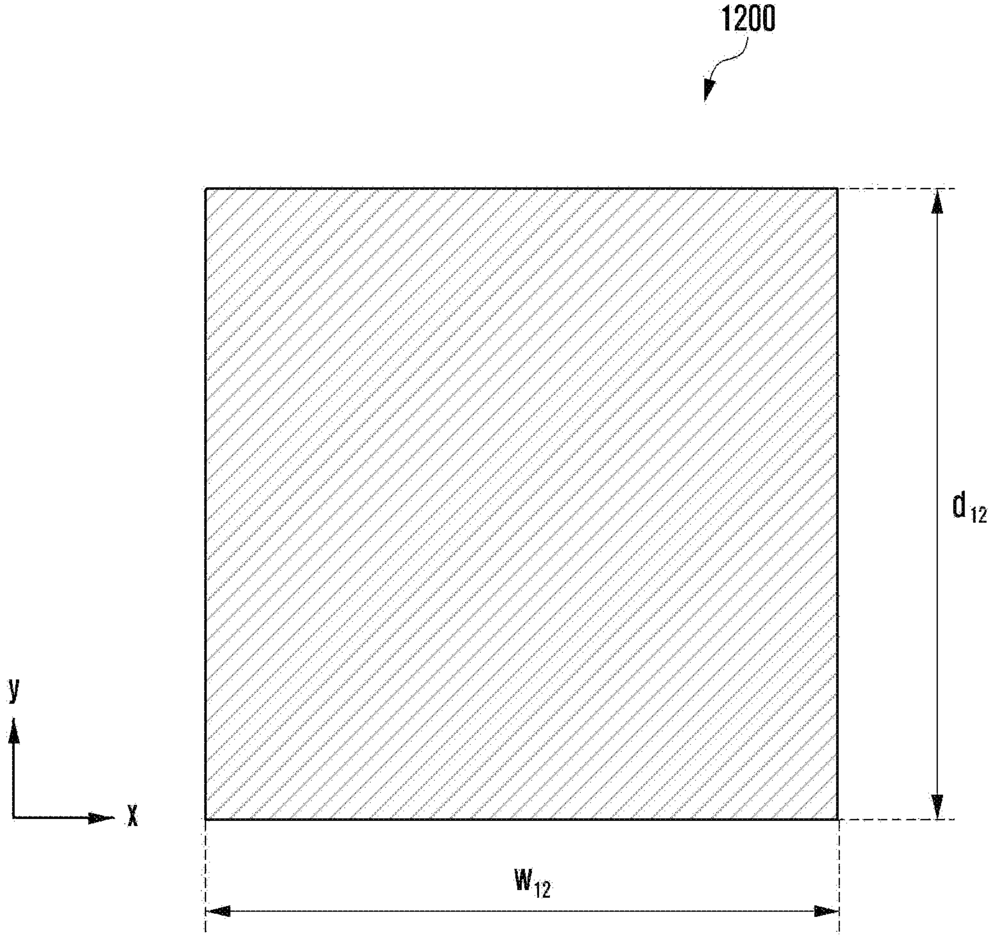
FIG. 12 is a conceptual diagram illustrating at least one floating radiator among a plurality of floating radiators of an antenna module of an electronic device, according to an embodiment of the disclosure.

FIG. 12 is a conceptual diagram illustrating at least one floating radiator among a plurality of floating radiators of an antenna module of an electronic device, according to an embodiment of the disclosure.

Referring to FIG. 12, a floating radiator 1200 may be a rectangular patch-type radiator. The floating radiator 1200 may be the same as or similar to at least one of the plurality of floating radiators 210*a* to 250*j* of FIG. 3.

For example, a horizontal length w12 and a vertical length d12 of the floating radiator 1200 may be determined based on the magnitude of wavelength of an electromagnetic field output from the plurality of antenna elements 110*a* to 140*c* of FIG. 3.

A factor value of each of the plurality of inductors 511 to 514 and the capacitor 520 of FIG. 5 may be determined according to at least one of the horizontal length w12 and the vertical length d12 of the floating radiator 1200. For example, an imaginary component of the factor value of each of the plurality of inductors 511 to 514 and the capacitor 520 may be determined according to at least one of the horizontal length w12 and the vertical length d12 of the floating radiator 1200. For example, an imaginary component of an inductance value of each of the plurality of inductors 511 to 514 and an imaginary component of a capacitance value of the capacitor 520 may be determined according to at least one of the horizontal length w12 and the vertical length d12 of the floating radiator 1200.

A direction of a second electromagnetic wave radiated from the floating radiator 1200 may be determined based on the imaginary component of the factor value of each of the plurality of inductors 511 to 514 and the capacitor 520 of FIG. 5. For example, the direction of the second electromagnetic wave radiated from the floating radiator 1200 may be determined based on at least one of the horizontal length w12 and the vertical length d12 of the floating radiator 1200. At least one of the horizontal length w12 and the vertical length d12 of the floating radiator 1200 may be determined such that a radiation direction of a second electromagnetic wave radiated from the floating radiator 1200 is the same as a radiation direction of a first electromagnetic wave radiated from the 1*a*-th antenna element 110*a*.

Figure 13:
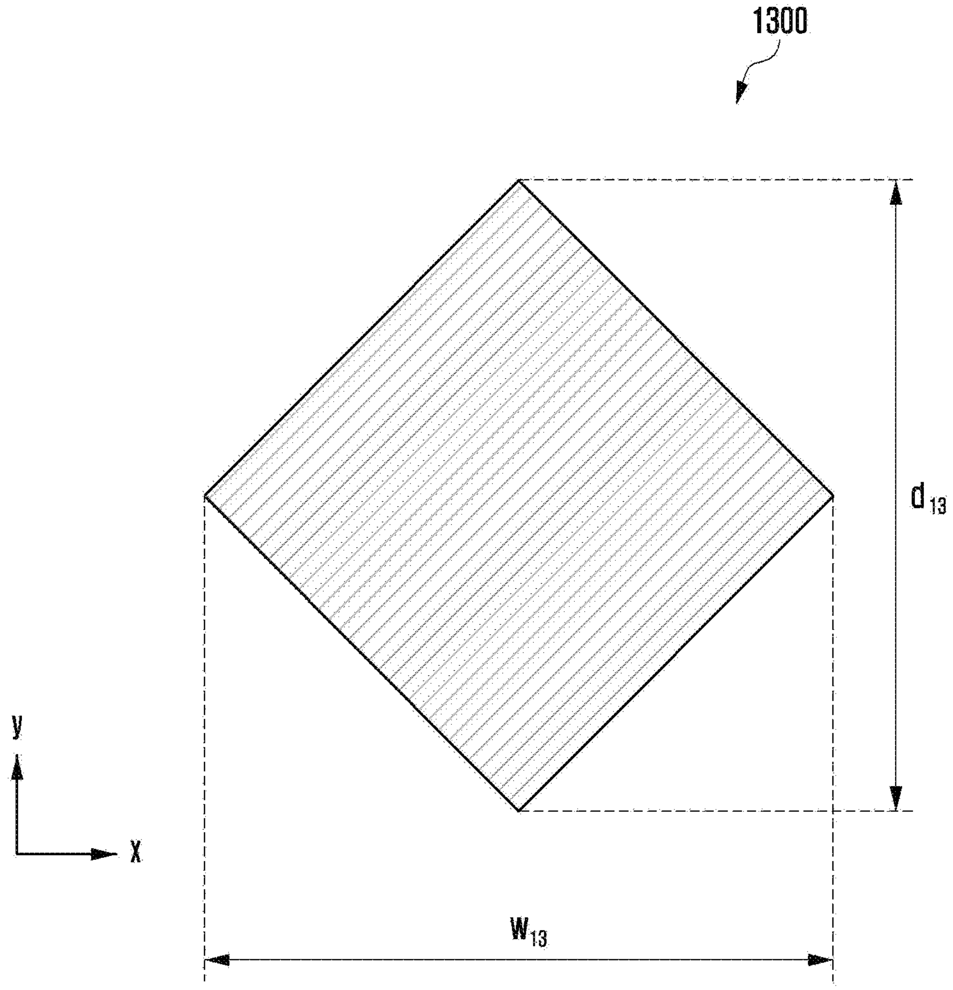
FIG. 13 is a conceptual diagram illustrating at least one floating radiator among a plurality of floating radiators of an antenna module of an electronic device, according to an embodiment of the disclosure.

FIG. 13 is a conceptual diagram illustrating at least one floating radiator among a plurality of floating radiators of an antenna module of an electronic device, according to an embodiment of the disclosure.

Referring to FIG. 13, a floating radiator 1300 may be a patch-type radiator having a diamond shape. The floating radiator 1300 may be the same as or similar to at least one of the plurality of floating radiators 210*a* to 250*j* of FIG. 3.

For example, a horizontal length w13 and a vertical length d13 of the floating radiator 1300 may be determined based on the magnitude of wavelength of an electromagnetic field output from the plurality of antenna elements 110*a* to 140*c* of FIG. 3.

A factor value of each of the plurality of inductors 511 to 514 and the capacitor 520 of FIG. 5 may be determined according to at least one of the horizontal length w13 and the vertical length d13 of the floating radiator 1300. For example, an imaginary component of the factor value of each of the plurality of inductors 511 to 514 and the capacitor 520 may be determined according to at least one of the horizontal length w13 and the vertical length d13 of the floating radiator 1300. For example, an imaginary component of an inductance value of each of the plurality of inductors 511 to 514 and an imaginary component of a capacitance value of the capacitor 520 may be determined according to at least one of the horizontal length w13 and the vertical length d13 of the floating radiator 1300.

A phase of a second electromagnetic wave radiated from the floating radiator 1300 may be determined based on the imaginary component of the factor value of each of the plurality of inductors 511 to 514 and the capacitor 520 of FIG. 5. For example, the phase of the second electromagnetic wave radiated from the floating radiator 1300 may be determined based on at least one of the horizontal length w13 and the vertical length d13 of the floating radiator 1300. At least one of the horizontal length w13 and the vertical length d13 of the floating radiator 1300 may be determined such that a phase of a second electromagnetic wave radiated from the floating radiator 1300 is the same as a phase of a first electromagnetic wave radiated from the 1*a*-th antenna element 110*a*.

Figure 14:
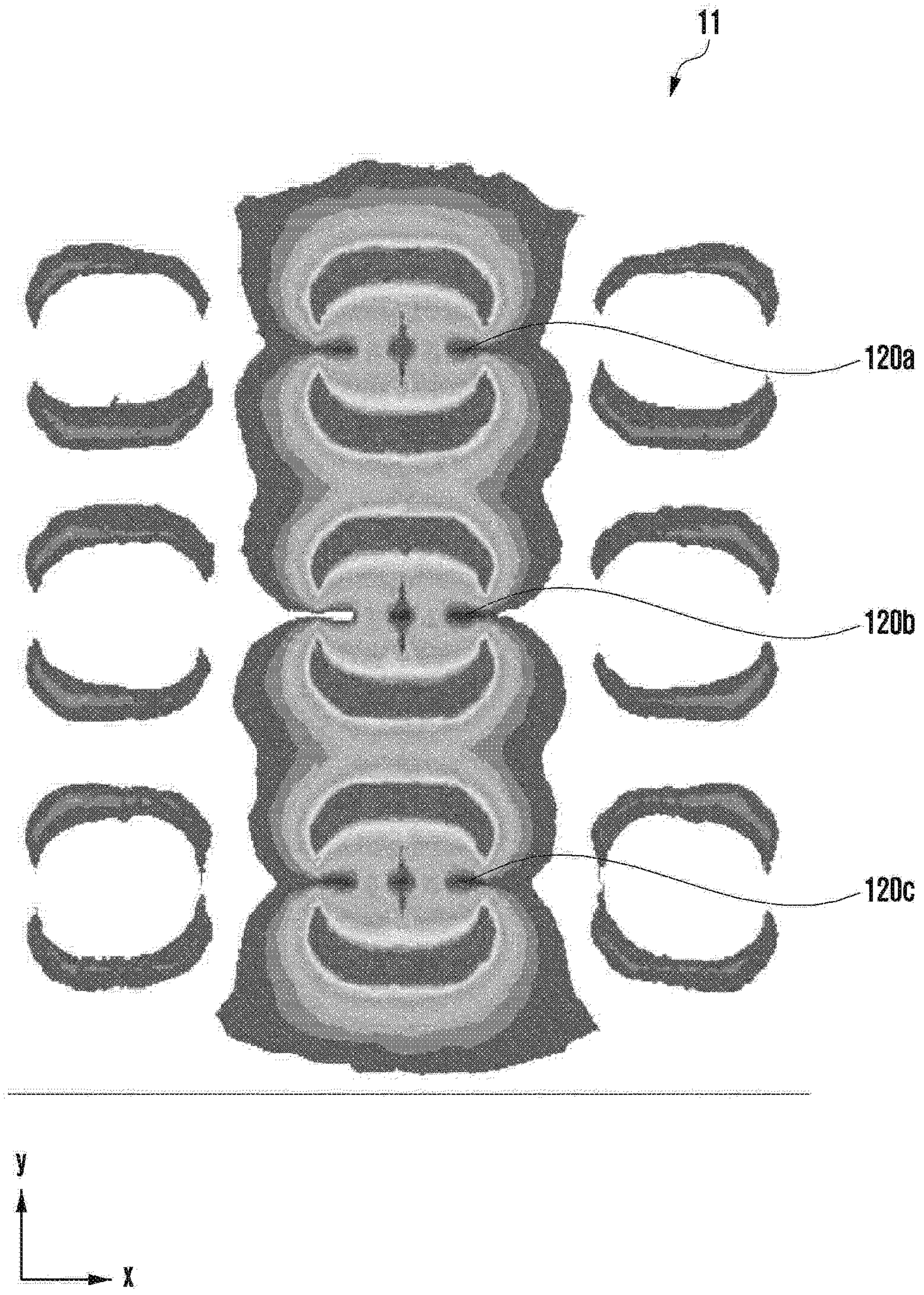
FIG. 14 is a conceptual diagram illustrating radiation characteristics of an antenna module of an electronic device which does not include a plurality of floating radiators, according to an embodiment of the disclosure.

FIG. 14 is a conceptual diagram illustrating radiation characteristics of an antenna module which does not include a plurality of floating radiators in an electronic device 10, according to an embodiment of the disclosure.

Referring to FIG. 14, radiation characteristics of the antenna module 11 which does not include the plurality of floating radiators 210*a* to 250*c* in the electronic device 10 may be shown in Table 1 below.

TABLE 1

| | Type | +45(−90/90) | −45(−90/90) | V(−90/90) | H(−90/90) |
|---|---|---|---|---|---|
| Side ratio [dB] | First column | 21.80/ 21.94 | 20.95/ 26.35 | | 28.13/ 32.25 |
| | Second column | 27.48/ 22.18 | 22.96/ 27.44 | 18.24/ 17.90 | |
| Rear ratio [dB] | First column | 18.05 | 18.49 | 19.06 | 22.25 |
| | Second column | 18.54 | 22.95 | 18.31 | 20.59 |

Figure 15:
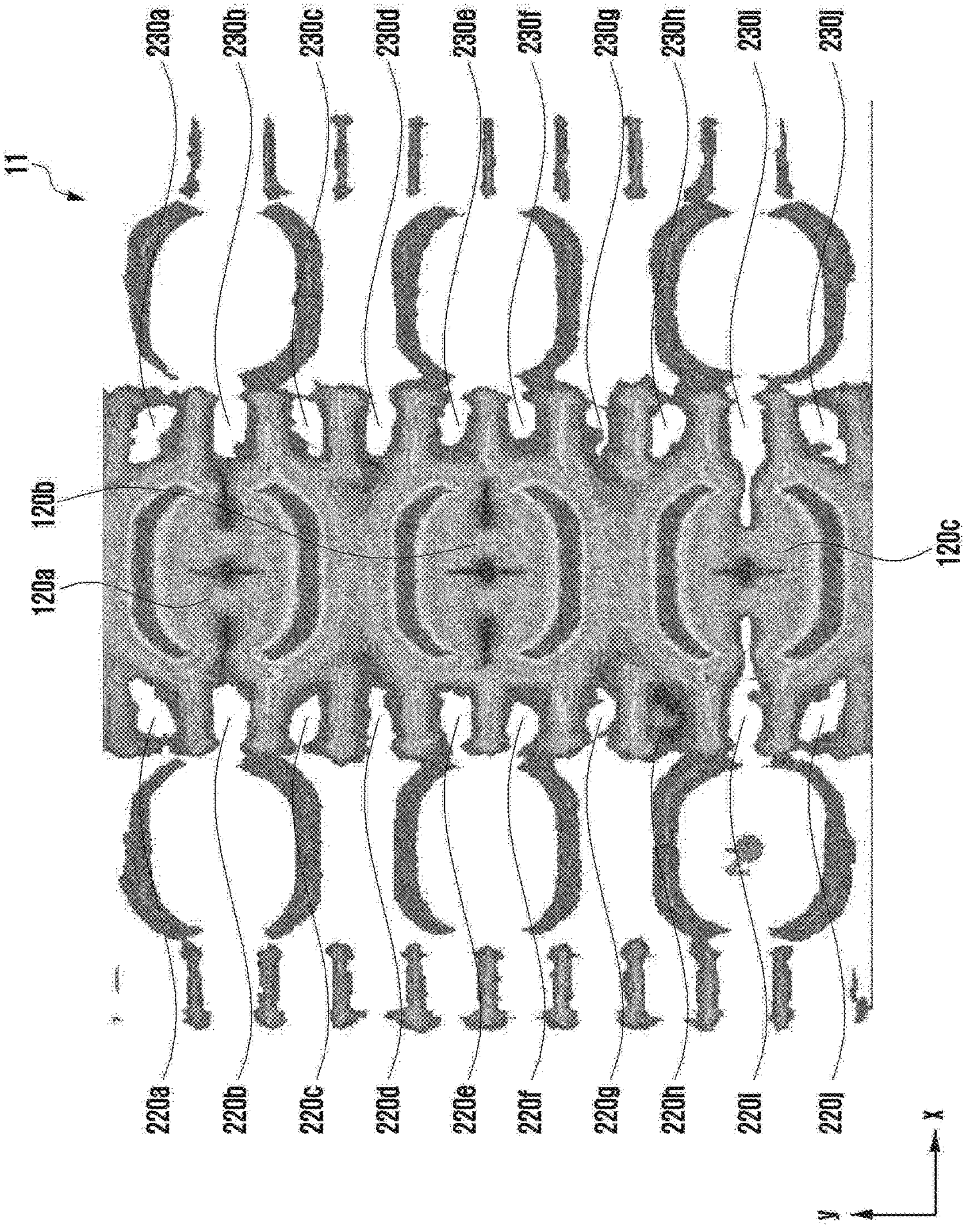
FIG. 15 is a conceptual diagram illustrating radiation characteristics of an antenna module of an electronic device which includes a plurality of floating radiators, according to an embodiment of the disclosure.

FIG. 15 is a conceptual diagram illustrating radiation characteristics of an antenna module which includes a plurality of floating radiators in an electronic device, according to an embodiment of the disclosure.

Referring to FIG. 15, due to the plurality of floating radiators 210*a* to 250*c*, a range of an electric field distributed on the surface of the antenna module 11 may be widened. The antenna module 11 may have a wide range of electric field distribution due to the plurality of floating radiators 210*a* to 250*c*. Accordingly, the width of a beam radiated from the antenna module 11 may be narrowed. For example, the antenna module 11 which includes the plurality of floating radiators 210*a* to 250*c* may have radiation characteristics as shown in Table 2 below.

TABLE 2

| | Type | +45(−90/90) | −45(−90/90) | V(−90/90) | H(−90/90) |
|---|---|---|---|---|---|
| Side ratio [dB] | First column | 22.30/ 21.86 | 20.39/ 24.32 | | 29.50/ 32.80 |
| | Second column | 26.86/ 26.14 | 23.84/ 27.83 | 20.07/ 19.81 | |

TABLE 2-continued

| | Type | +45(−90/90) | −45(−90/90) | V(−90/90) | H(−90/90) |
|---|---|---|---|---|---|
| Rear ratio [dB] | First column | 21.01 | 20.39 | 18.70 | 23.42 |
| | Second column | 19.61 | 19.52 | 22.10 | 21.62 |

Referring to the radiation characteristics in FIGS. 14 and 15 and Table 1 and Table 2, a side ratio of the antenna module 11 of the electronic device 10 which includes the plurality of floating radiators 210*a* to 250*c* may have more improved characteristics than a side ratio of the antenna module 11 of the electronic device 10 which does not include the plurality of floating radiators 210*a* to 250*c*. A rear ratio of the antenna module 11 of the electronic device 10 which includes the plurality of floating radiators 210*a* to 250*c* may have more improved characteristics than a rear ratio of the antenna module 11 of the electronic device 10 which does not include the plurality of floating radiators 210*a* to 250*c*. In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The disclosure may be used in the electronics industry and the information and communications industry.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna module comprising:

a board;

an antenna array including a plurality of sub-arrays, wherein each of the plurality of sub-arrays includes antenna elements arranged in a line along a designated direction; and a plurality of floating radiator arrays arranged to be spaced apart from the plurality of sub-arrays by a first distance on the board, wherein each of the plurality of floating radiator arrays includes floating radiators arranged in a line along the designated direction, wherein the plurality of floating radiator arrays are arranged alternatively with the plurality of sub-arrays on the board, wherein each of the floating radiators is formed in a ring shape, and wherein the plurality of floating radiator arrays are configured to be electromagnetically coupled to the antenna array.

2. The antenna module of claim 1, wherein the antenna module further comprises:

feeding circuitry configured to supply an electrical signal to the antenna array, wherein the antenna array is configured to radiate a first electromagnetic wave, based on the electrical signal, wherein a first floating radiator array of the plurality of floating radiator arrays is disposed on a first side of a first sub-array of the antenna array, and wherein a second floating radiator array of the plurality of floating radiator arrays is disposed on a second side of the first sub-array.

3. The antenna module of claim 2, wherein the first floating radiator array among the plurality of floating radiator arrays is disposed to be spaced apart from the first side of the first sub-array of the antenna array by the first distance.

4. The antenna module of claim 3, wherein the second floating radiator array among the plurality of floating radiator arrays is disposed to be spaced apart from the second side of the first sub-array of the antenna array by the first distance.

5. The antenna module of claim 1, wherein the ring shape comprises at least one of a rectangular ring shape, a circular ring shape, or a diamond-shaped ring shape.

6. The antenna module of claim 4, wherein the second floating radiator array among the plurality of floating radiator arrays is disposed to be spaced apart from a first side of a second sub-array of the antenna array by the first distance, and wherein a distance between the first floating radiator array and the second floating radiator array is greater than a distance between the first sub-array and a second sub-array.

7. The antenna module of claim 2, wherein the first sub-array is connected to the feeding circuitry.

8. The antenna module of claim 1, wherein each of the floating radiators has a capacitance and at least one inductance.

9. The antenna module of claim 8, wherein the at least one inductance comprises a first inductance to a fourth inductance, and wherein the capacitance and the first inductance to the fourth inductance are determined according to at least one of a horizontal length and a vertical length of a corresponding floating radiator.

10. The antenna module of claim 9, wherein a phase of an electromagnetic wave radiated from a corresponding floating radiator is determined based on an imaginary component of the capacitance and the first inductance to the fourth inductance.

11. The antenna module of claim 8, wherein the capacitance and the at least one inductance are determined according to at least one of a horizontal length, a vertical length, a thickness, and a line width of the corresponding floating radiator.

12. The antenna module of claim 1, wherein upper surfaces of the antenna elements are spaced apart from an upper surface of the board by a second distance different from the first distance.

13. The antenna module of claim 12, wherein upper surfaces of the floating radiators are spaced apart from the upper surface of the board by the second distance.

14. The antenna module of claim 13, wherein the first distance corresponds to the second distance.

* * * * *